US010515287B2

(12) United States Patent
Harada et al.

(10) Patent No.: US 10,515,287 B2
(45) Date of Patent: Dec. 24, 2019

(54) IMAGE RETRIEVAL APPARATUS, COMPUTER READABLE MEDIUM, AND METHOD FOR SPECIFYING AN IMAGE GROUP AND EXTRACTING A REPRESENTATIVE IMAGE

(71) Applicant: OLYMPUS CORPORATION, Hachioji-shi, Tokyo (JP)

(72) Inventors: Hisayuki Harada, Tokyo (JP); Yuichi Tsuchimochi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 222 days.

(21) Appl. No.: 15/635,849

(22) Filed: Jun. 28, 2017

(65) Prior Publication Data

US 2018/0012103 A1    Jan. 11, 2018

(30) Foreign Application Priority Data

Jul. 6, 2016    (JP) ................................. 2016-134540

(51) Int. Cl.
*G06K 9/00*    (2006.01)
*G06K 9/46*    (2006.01)
(Continued)

(52) U.S. Cl.
CPC ........... *G06K 9/4604* (2013.01); *G06F 16/55* (2019.01); *G06K 9/00677* (2013.01); (Continued)

(58) Field of Classification Search
CPC ........... G06K 9/00221; G06K 9/00288; G06K 9/00302; G06K 9/00308; G06K 9/00335; G06K 9/00355; G06K 9/00624; G06K 9/00664; G06K 9/00677; G06K 9/00684; G06K 9/00765; G06K 9/4604; G06K 9/62; G06K 9/6201; G06K 9/6202;
(Continued)

(56) References Cited

U.S. PATENT DOCUMENTS 7,202,873 B2 *    4/2007    Akahori ................ G06F 16/583
382/304
7,688,379 B2 *    3/2010    Forman .............. H04N 5/23212
382/305
(Continued)

FOREIGN PATENT DOCUMENTS

JP    2003199028 A  *    7/2003
JP    2008-141270 A    6/2008
JP    2015-008385 A    1/2015

*Primary Examiner* — Eric Rush
(74) *Attorney, Agent, or Firm* — Volpe and Koening, P.C.

(57) ABSTRACT

An image retrieval apparatus includes a processor, and the processor performs a process including: determining an image in which a first characteristic object is included in a subject to be a first image, and determining an image that is captured after the first image and in which a second characteristic object is included in the subject to be a second image, from among a series of captured images; specifying images as an image group, the images being captured during a period after the first image is captured before the second image is captured from among the series of captured images; and extracting a representative image from the image group.

13 Claims, 21 Drawing Sheets

(51) Int. Cl.
*G06F 16/55* (2019.01)
*G06T 7/11* (2017.01)
*G06K 9/62* (2006.01)

(52) U.S. Cl.
CPC ....... *G06K 9/00765* (2013.01); *G06K 9/6202* (2013.01); *G06K 9/6267* (2013.01); *G06T 7/11* (2017.01); *G06T 2207/10016* (2013.01)

(58) Field of Classification Search
CPC .... G06K 9/6218; G06K 9/6228; G06K 9/623; G06K 9/6267; G06T 7/11; G06T 2207/10004; G06T 2207/10016; G06F 16/51; G06F 16/54; G06F 16/55; G06F 16/58; G06F 16/583; G06F 16/5854; G06F 16/587; H04N 1/215
USPC ....... 382/100, 112, 181, 190, 209, 217, 218, 382/224, 225, 232, 255, 276, 298, 299, 382/305, 312, 325; 348/231.99, 231.2, 348/333.05, 333.11; 396/128; 707/723, 707/737, 740, 741, 748, 752
See application file for complete search history.

(56) References Cited

U.S. PATENT DOCUMENTS

| | | | | |
|---|---|---|---|---|
| 7,908,547 | B2* | 3/2011 | Isomura | G06T 11/60 715/204 |
| 8,542,950 | B2* | 9/2013 | Berg | G06F 16/583 382/305 |
| 8,774,528 | B2* | 7/2014 | Hibino | G06K 9/00671 382/218 |
| 9,495,583 | B2* | 11/2016 | Gilley | G06K 9/00288 |
| 2007/0077025 | A1* | 4/2007 | Mino | G06K 9/46 386/241 |
| 2008/0292212 | A1* | 11/2008 | Ozaki | G06F 16/51 382/284 |
| 2009/0092312 | A1* | 4/2009 | Kasahara | G06K 9/00664 382/159 |
| 2010/0020224 | A1* | 1/2010 | Hattori | G06K 9/00221 382/224 |
| 2010/0278396 | A1* | 11/2010 | Mitsuhashi | G06K 9/00624 382/118 |
| 2013/0156275 | A1* | 6/2013 | Amacker | G06K 9/00677 382/118 |
| 2014/0354845 | A1* | 12/2014 | Molgaard | H04N 5/23216 348/222.1 |
| 2015/0086123 | A1* | 3/2015 | Wang | G06F 16/583 382/224 |

* cited by examiner

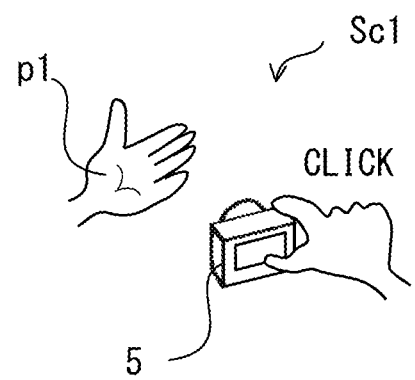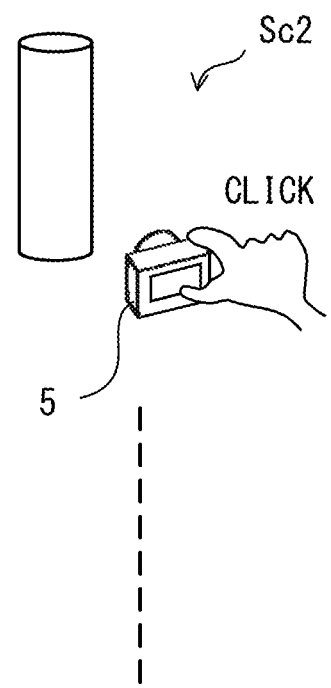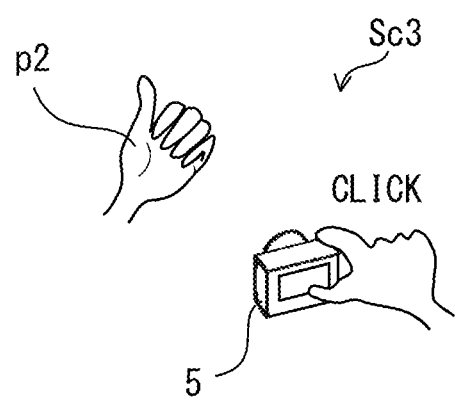
F I G. 4

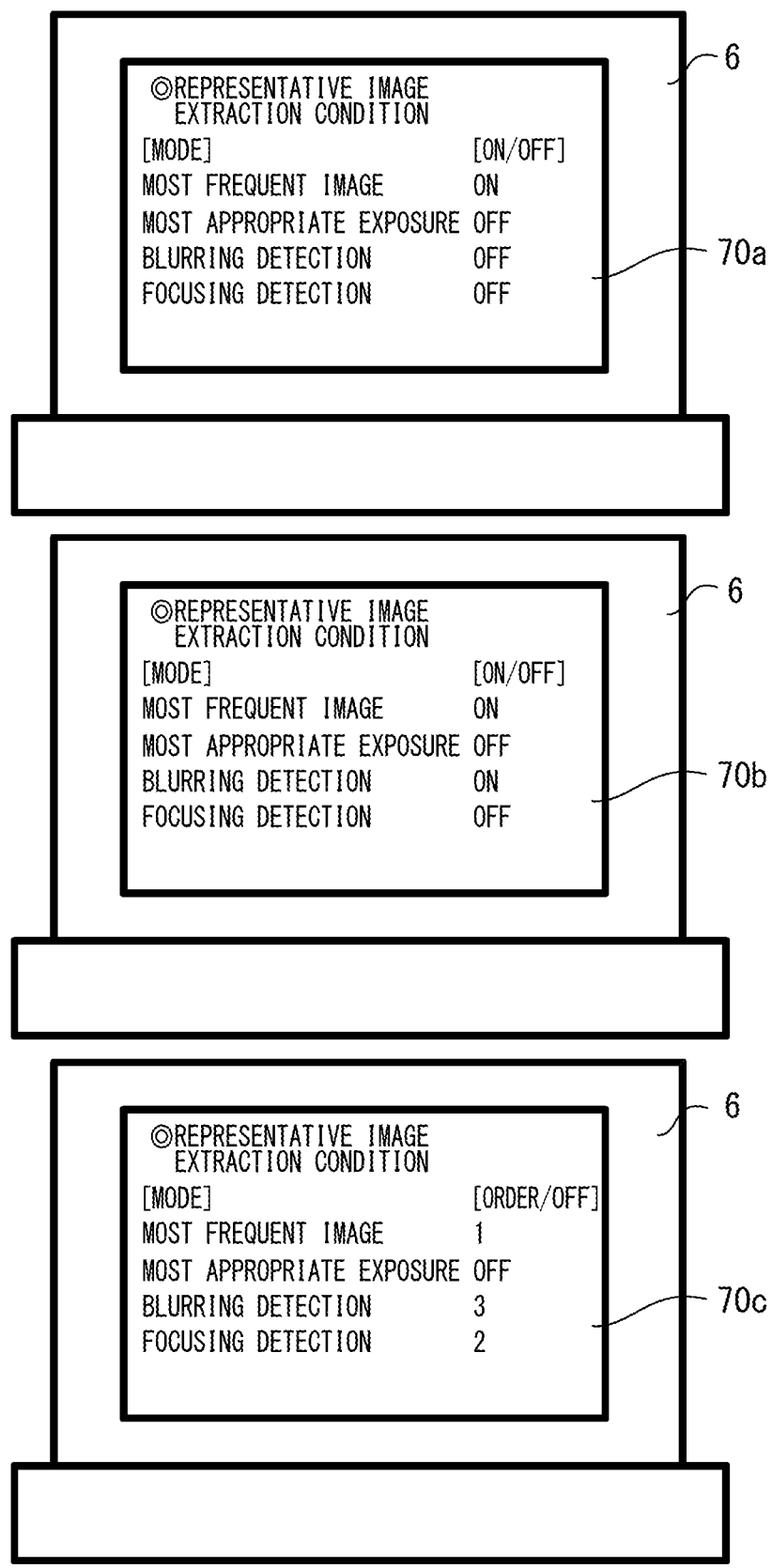
F I G. 7

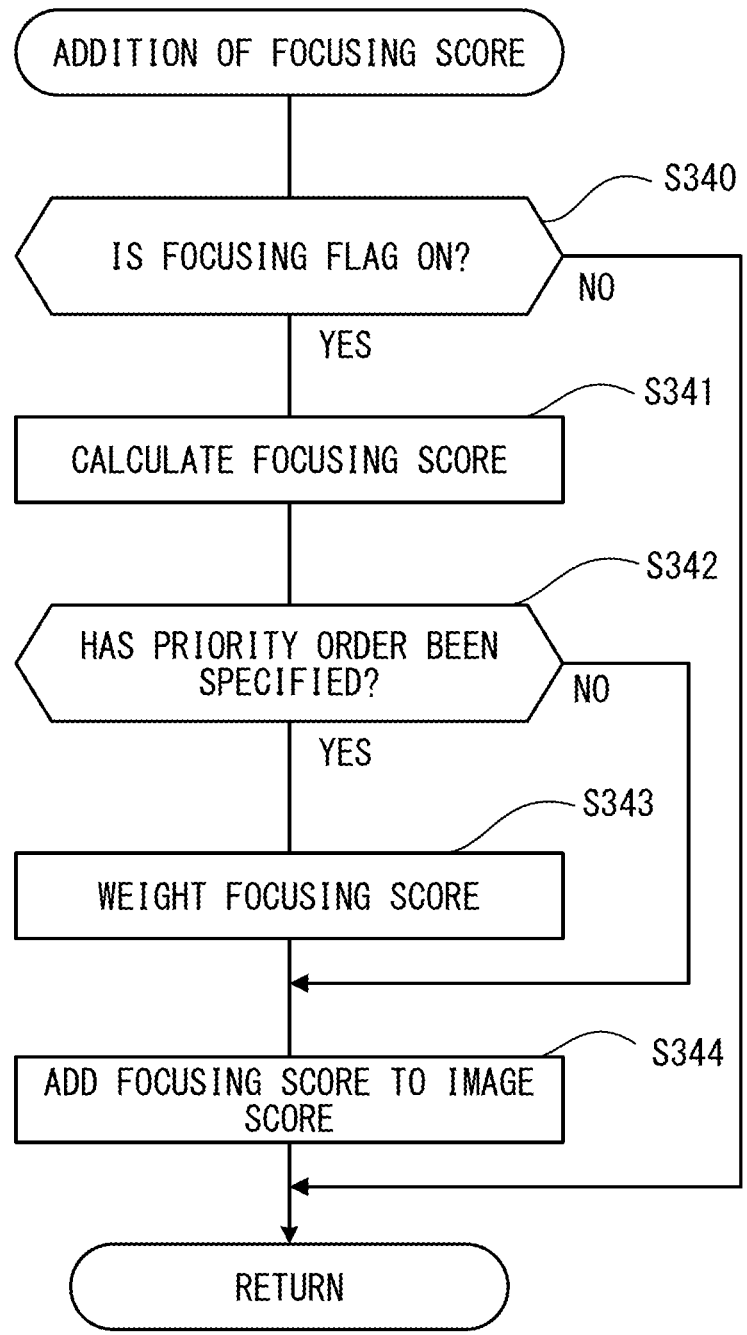
F I G. 1 4

|  | MOST FREQUENT IMAGE SCORE | EXPOSURE SCORE | SUBJECT BLURRING SCORE | FOCUSING SCORE | TOTAL IMAGE SCORE |
|---|---|---|---|---|---|
| D3 | 0 | 9 | 8 | 9 | 26 |
| D4 | 3 | 9 | 9 | 9 | 30 |
| D5 | 3 | 9 | 8 | 9 | 29 |
| D6 | 5 | 9 | 8 | 9 | 31 |
| D7 | 9 | 9 | 0 | 9 | 27 |
| D8 | 9 | 9 | 9 | 0 | 27 |
| D9 | 9 | 2 | 9 | 9 | 29 |
| D10 | 9 | 9 | 9 | 9 | 36 |
| D11 | 9 | 2 | 9 | 9 | 29 |

FIG. 15

IMAGE RETRIEVAL APPARATUS, COMPUTER READABLE MEDIUM, AND METHOD FOR SPECIFYING AN IMAGE GROUP AND EXTRACTING A REPRESENTATIVE IMAGE

CROSS-REFERENCE TO RELATED APPLICATIONS

This application is based upon and claims the benefit of priority of the prior Japanese Patent Application No. 2016-134540, filed on Jul. 6, 2016, the entire contents of which are incorporated herein by reference.

BACKGROUND OF THE INVENTION

Field of the Invention

The present invention relates to an image retrieval apparatus and an image retrieval method, and relates an image retrieval technology for classifying a large number of captured images.

Description of the Related Art

In photographing relating to business, in many cases, a large number of images are captured, and an image meeting a particular condition is selected and used from among the large number of images. As an example, in photographing performed to record a construction state at a construction site, a photographic failure or photographic omission is not acceptable. Therefore, plural images are captured as spares in the same place, and several hundred to several thousand images are captured at one site. A significant effort is required to manage such a large number of images. In addition, the recording of a construction state includes the photographing of a portion of construction that can be photographed only during a limited period according to a stage of a process, and therefore the management of a photographing schedule is also complicated.

Meanwhile, digitalization has progressed in photographing for business use, and the management of images has also been drastically advanced. However, the number of images is large, and the management is still complicated. In particular, when plural images including preliminary images are photographed in one portion in a certain construction state, a task of selecting a representative image from the plural images is required. When the scale of a building increases, the total number of images becomes several thousand to several tens of thousand. A task of selecting a representative image cannot be performed in a short time, and a large burden is imposed on a process manager such as a field supervisor when preparing materials.

As an example of a selection technology for automatically selecting a representative image, Patent Document 1 has been proposed. In the technology described in Patent Document 1, images having similar compositions or the like are collected as an image group, and the most representative image is selected from the image group.

In addition, a technology in which a photographer specifies an image group from among a series of images has been proposed. As an example, in Patent Document 2, a technology has been proposed for recording an image different from normally captured images as a paragraph image for delimiting. The paragraph image described in Patent Document 2 is a "monochrome or blue-back" image, or has a "peculiar shape that is different from the shape of another image". An arrow is given to an image frame, or a frame itself is changed to a frame different from the frame of a normal image.

[Patent Document 1] Japanese Laid-Open Patent Publication No. 2015-8385

[Patent Document 2] Japanese Laid-Open Patent Publication No. 2008-141270

SUMMARY OF THE INVENTION

In order to achieve the object above, an image retrieval apparatus includes a processor, and the processor performs a process including: determining an image in which a first characteristic object is included in a subject to be a first image, and determining an image that is captured after the first image and in which a second characteristic object is included in the subject to be a second image, from among a series of captured images; specifying images as an image group, the images being captured during a period after the first image is captured before the second image is captured from among the series of captured images; and extracting a representative image from the image group.

BRIEF DESCRIPTION OF THE DRAWINGS

FIG. 4 illustrates an example of photographing situations of first and second characteristic objects according to a first embodiment.

FIG. 7 illustrates an extraction condition establishing screen according to the first embodiment.

FIG. 14 illustrates a subroutine of focusing score addition processing according to the first embodiment.

FIG. 15 is a table illustrating calculated scores according to the first embodiment.

DETAILED DESCRIPTION OF THE PREFERRED EMBODIMENTS

Figure 1:
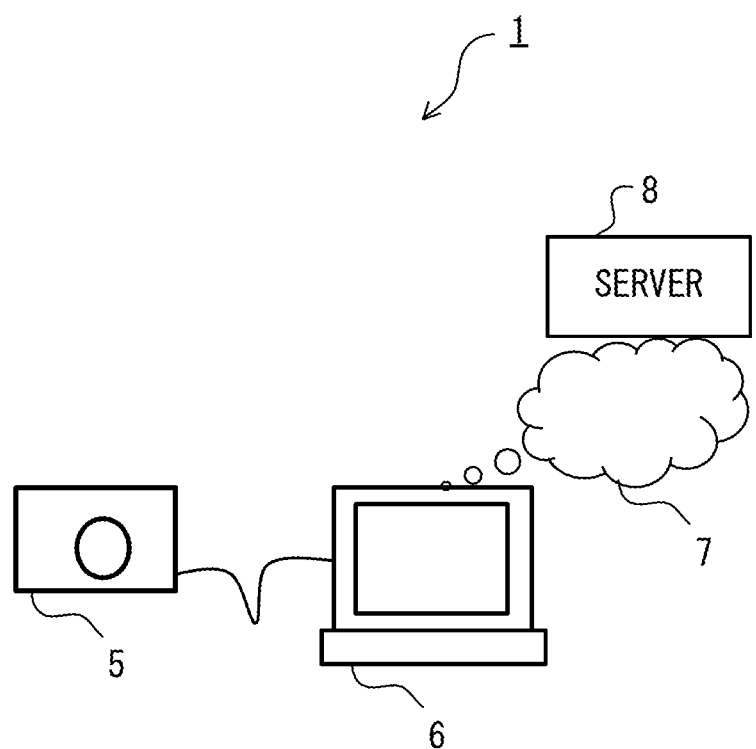
FIG. 1 is a general view of a photographing system according to embodiments of the present invention.

Embodiments of the present invention are described below with reference to the drawings. FIG. 1 is a block diagram illustrating an exemplary configuration of a photographing system 1. An example is described below in which a portion of construction (for example, a pillar, a wall, or the like) at a construction site is recorded as a target to be photographed in the present invention, but the target to be photographed is not limited to a portion of construction. The present invention is applicable to any business type in which a large number of images are recorded other than photographing at a construction site. As an example, the present invention is applicable to the recording of nature observation, the recording of an inspection of a plant, or the like. Note that an image obtained by photographing a portion of construction is referred to as a construction image.

A person in charge of photographing (hereinafter abbreviated to a "photographer") photographs a portion of construction by using a camera 5. The photographer connects the camera 5 to an information processing apparatus 6, outputs a captured image (a construction image) to the information processing apparatus 6, and stores the captured image in the information processing apparatus 6. The information processing apparatus 6 is, for example, a personal computer (PC). The information processing apparatus 6 performs image retrieval processing on a series of captured images. The image retrieval processing is processing for, for example, classifying a plurality of captured images into image groups for respective construction targets and extracting a representative image from each of the image groups generated by classification. The information processing apparatus 6 transmits a captured image on which the image retrieval processing has been completed to a server 8 via a network 7. The server 8 stores the received captured image in a database (not illustrated). The image retrieval processing performed by the information processing apparatus 6 will be described below in detail.

Figure 2:
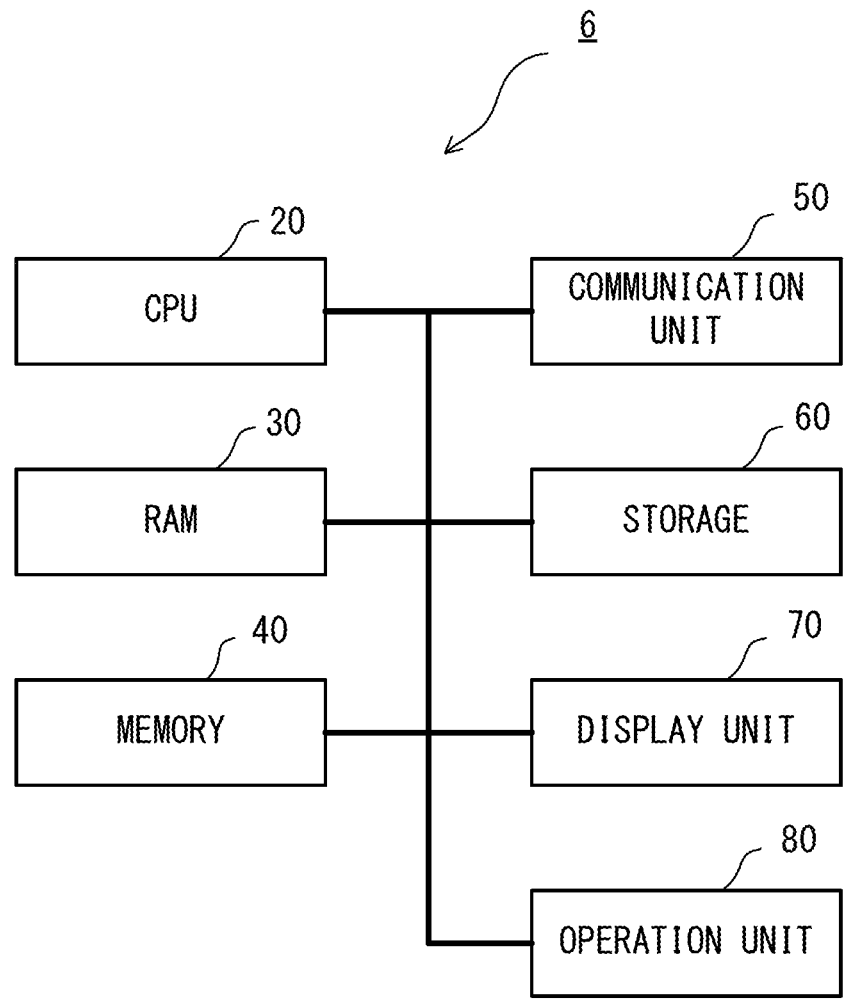
FIG. 2 illustrates a hardware configuration of an information processing apparatus according to the embodiments of the present invention.

FIG. 2 is a hardware block diagram of the information processing apparatus 6. The information processing apparatus 6 includes a central processing unit (CPU) 20, a random access memory (RAM) 30, a memory 40, a communication unit 50, a storage 60, a display unit 70, an operation unit 80, and the like. The CPU 20 reads a control program, executes the read control program, and implements prescribed processing. The CPU 20 is also referred to as a processor.

The RAM 30 is a transitory storage that transitorily stores a control program and image data. The RAM 30 is, for example, a dynamic random access memory (DRAM). The memory 40 is a storage that stores various types of tables, control programs, image data, or the like in a non-volatile manner. The memory 40 is, for example, a flash memory.

The communication unit 50 is a communication interface that performs data communication with an external device. The communication unit 50 conforms to a scheme such as a local area network (LAN) or a wide area network (WAN). The storage 60 is a storage that stores image data and the like in a non-volatile manner. The storage 60 is a hard disk drive (HDD) or a flash memory. The display unit 70 displays screens or messages for various operations, or a captured image. The operation unit 80 is used for a photographer to input the content of an instruction, and any of a keyboard, a mouse, and a touch panel can be used as the operation unit 80.

Figure 3:
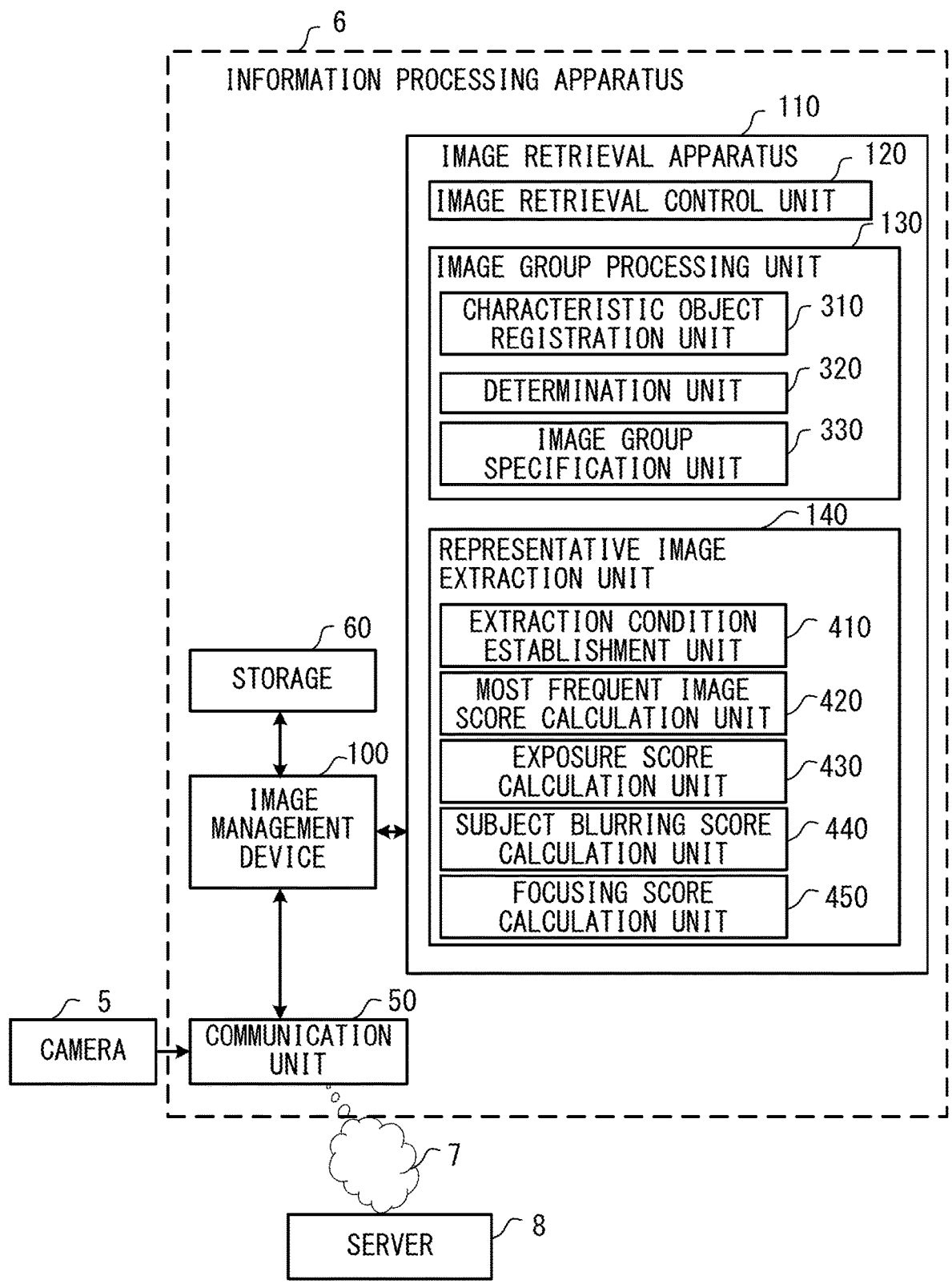
FIG. 3 is a functional block diagram that principally illustrates an information processing apparatus according to the embodiments of the present invention.

FIG. 3 is a functional block diagram of the information processing apparatus 6. The information processing apparatus 6 includes an image management device 100 and an image retrieval apparatus 110 in addition to the communication unit 50 and the storage 60. The image management device 100 and the image retrieval apparatus 110 are implemented by the CPU 20 that reads the control program stored in the memory 40.

The image management device 100 manages transmission or reception, recording, and the like of image data. The image management device 100 stores, in the storage 60, image data of a series of captured images that are transmitted from the camera 5. The image management device 100 also transmits the image data to the server 8 via the communication unit 50 through the network 7. In addition, the image management device 100 changes the format or compression ratio of the image data, and stores the image data in the storage 60 in accordance with an instruction from the image retrieval apparatus 110. Further, the image management device 100 changes the format or compression ratio of the image data, and transmits the image data to the server 8.

The image retrieval apparatus 110 includes an image retrieval control unit 120, an image group processing unit 130, and a representative image extraction unit 140. The image retrieval control unit 120 controls the entirety of the image retrieval apparatus 110. The image retrieval control unit 120 issues, to the image management device 100, an instruction to change the format or compression ratio of image data, an instruction to transmit the image data to the server 8, or other instructions.

The image group processing unit 130 classifies (divides) a series of captured images according to the intention of a photographer. A group of one or more classified captured images is referred to as an image group. The image group processing unit 130 detects an image obtained by photographing a specific subject from among a series of captured images, and generates an image group according to the position of the image obtained by photographing the specific subject. Hereinafter, the specific subject is referred to as a characteristic object, and an image obtained by photographing the characteristic object is referred to as a characteristic image. Plural types of characteristic objects can be registered in advance, and a series of captured images can be easily classified or post-processed by properly using the plural registered characteristic objects. In addition, in the embodiments, an image obtained by photographing an original target to be photographed, such as a portion of construction, is also referred to as a target object image in order to distinguish the image from a characteristic image.

As an example of the characteristic object, a first characteristic object, a second characteristic object, a third characteristic object, a fourth characteristic object, and a fifth characteristic object are described. An image including the first characteristic object is referred to as a first image, and the same applies to the second characteristic object and the subsequent characteristic objects.

The first image is an image indicating a start position of an image group, and the second image is an image indicating an end position of the image group. Stated another way, when the first characteristic object is photographed in a photographing start position of an image group, and the second characteristic object is photographed in a photographing end position of the image group, one or more images captured during this period are specified as an image group. The first image and the second image will be described later in a first embodiment.

The third image is an image indicating a division position in a case in which the image group specified by the first image and the second image is further divided. Stated another way, when the third characteristic object is photographed in a desired division position, an image group can be divided in the position. Groups generated due to division using the third image are referred to as image subgroups. The third image will be described later in a second embodiment.

The fourth image is an image indicating a start position of retrieval processing for specifying an image group, and the fifth image is an image indicating an end position of the retrieval processing for specifying an image group. As described later, an arbitrary subject can be registered as a characteristic object. Therefore, when a commonplace subject is registered as a characteristic object, a start position and an end position of an image group may be erroneously detected. By using the fourth image and the fifth image indicating a start position and an end position of the image retrieval processing, an image group can be effectively prevented from being erroneously detected. The fourth image and the fifth image will be described later in a third embodiment.

The image group processing unit 130 includes a characteristic object registration unit 310, a determination unit 320, and an image group specification unit 330. The characteristic object registration unit 310 registers a characteristic object that is used to specify an image group, an image subgroup, and the like according to an instruction or selection of a photographer. The photographer can register an arbitrary subject as a characteristic object. The characteristic object may be a portion (a hand, a foot, or a face) of the human body or an object (a hat or a notebook), or may be a gesture, or a character or a figure written on a blackboard or the like.

The characteristic object registration unit 310 specifies a subject within a certain region in the center of a screen from an image captured as a characteristic image, analyzes image data of the subject, and detects the shape, color pattern, and the like of the specified subject as characteristic object data. The characteristic object registration unit 310 registers the characteristic object data together with the captured characteristic image in the memory 40.

As a specific operation to register characteristic data, the characteristic object registration unit 310 may photograph a characteristic object by using the camera 5 in a situation different from a series of operations to photograph a portion of construction, and may perform a registration operation by using the operation unit 80. This registration operation may be performed before or after the series of photographing operations.

Alternatively, a photographer may determine a characteristic object before the series of photographing operations, and may photograph the determined characteristic object, for example, in a position where the photographer desires to incorporate a separation into the series of photographing operations. The photographer may reproduce a series of captured images after photographing, may detect a captured characteristic image, and may perform one registration operation. Once a characteristic image that first appears from among a series of captured images is registered, characteristic images that repeatedly appear thereafter are automatically detected.

Alternatively, a photographer may determine and register a characteristic image to be used this time from among characteristic images that have been registered and have been stored in the memory 40, before a series of photographing operations are started. The photographer may remember the registered characteristic image, and may photograph a subject equivalent to the characteristic image, for example, in a delimiting position of an image group.

The determination unit 320 refers to the characteristic object data registered by the characteristic object registration unit 310, and detects a subject having a pattern similar to the characteristic object data from among captured images. The determination unit 320 determines the type of the detected characteristic object.

The image group specification unit 330 specifies an image group according to the determined type of the characteristic image, and its photographing date or its photographing order. As an example, the image group specification unit 330 specifies images captured during a period after the first image is captured and before the second image is captured to be one image group. When the third image is determined by the determination unit 320, the image group specification unit 330 divides one specified image group into images captured before the third images and images captured after the third image, and generates a plurality of image subgroups.

The representative image extraction unit 140 extracts a representative image from a plurality of captured images included in an image group or an image subgroup specified by the image group processing unit 130 in accordance with a prescribed extraction condition. The representative image extraction unit 140 includes an extraction condition establishment unit 410, a most frequent image score calculation unit 420, an exposure score calculation unit 430, a subject blurring score calculation unit 440, and a focusing score calculation unit 450.

The extraction condition establishment unit 410 establishes an extraction condition according to an instruction of a photographer. The most frequent image score calculation unit 420 determines the shape and composition of a main subject in a plurality of captured images included in an image group or an image subgroup. The most frequent image score calculation unit 420 groups captured images in which a main subject has a similar shape and composition in accordance with the determined shapes and compositions of the main subjects, and classifies the captured images into several groups. The most frequent image score calculation unit 420 increases scores for images that belong to a group including a large number of images. A captured image that belongs to a group including a small number of captured images that are similar to each other has a low score.

The exposure score calculation unit 430 determines a degree of appropriateness of an exposure in accordance with a luminance value of image data of a main subject in each of the captured images included in the specified image group or image subgroup, and calculates a score according to the degree of appropriateness of the exposure. The exposure score calculation unit 430 increases a score for a captured image having a high degree of appropriateness of the exposure.

The subject blurring score calculation unit 440 measures an amount of blurring of a subject in each of the captured images included in the specified image group or image subgroup in accordance with, for example, edge detection of the image data of the main subject, and calculates a score of subject blurring. The subject blurring score calculation unit 440 increases a score for a captured image for which an amount of blurring of a subject is small.

The focusing score calculation unit 450 calculates a score of a degree of focusing of a main subject in each of the captured images included in the specified image group or image subgroup in accordance with a high-frequency component of the image data of the main subject. The focusing score calculation unit 450 increases a score for a captured image for which the degree of focusing of the main subject is high.

Assume, as an example, that each score such as a most frequent image score is a ten-level numerical value, 0 to 9. As an example, the most frequent image score calculation unit 420 calculates the score of an image that belongs to a class including a large number of images to be 9. The same applies to an exposure score, a subject blurring score, and a focusing score.

The representative image extraction unit 140 sums the most frequent image score, the exposure score, the subject blurring score, and the focusing score for each of the captured images included in the specified image group or subgroup so as to calculate a total score. The representative image extraction unit 140 extracts a captured image having a maximum total score as a representative image from the respective captured images included in the specified image group or image subgroup. The representative image extraction unit 140 does not always extract one representative image, and may extract plural representative images.

First Embodiment

A first embodiment is described next. The first embodiment is an example in which an image group is specified by photographing the first characteristic object and the second characteristic object, and a representative image is extracted from the specified image group. FIG. 4 specifically illustrates a series of photographing situations including photographing of the first characteristic object and the second characteristic object.

Photographing situation Sc1 is a situation in which a first characteristic object p1 is photographed when the photographing of an image group is started. In this example, assume that an open hand is the first characteristic object p1. After photographing the first characteristic object p1, a required number of images of an actual subject (a target object) are captured. Photographing situation Sc2 is an example of a situation in which an actual subject, a portion of construction (a pillar) in this example, is photographed. Photographing situation Sc3 is a situation in which a second characteristic object p2 is photographed after the photographing of the image group is finished. In this example, assume that a closed hand is the second characteristic object p2.

Figure 5:
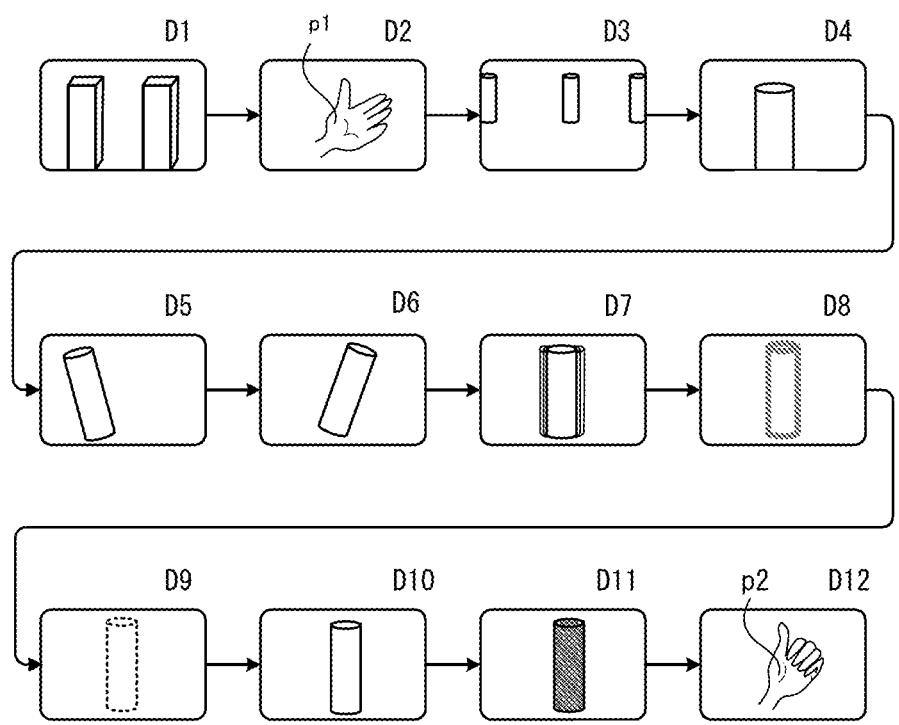
FIG. 5 illustrates an example of a series of captured images according to the first embodiment.

FIG. 5 is a diagram in which images captured in the series of photographing situations illustrated in FIG. 4 are arranged in order of earliness of a photographing timing. Image D1 is an image that is captured first, and image D12 is an image that is captured last. Note that image D1 is an image captured before the photographing of the image group. Image D2 is a first image including the first characteristic object p1, which is an open hand. Image D12 is a second image including the second characteristic object p2, which is a closed hand. Image D2 and image D12 are characteristic images. Image D1 and image D3 to image D11 are target object images obtained by photographing a portion of construction, and image D3 to image D11 between the first image (image D2) and the second image (image D12) configure an image group.

Figure 6:
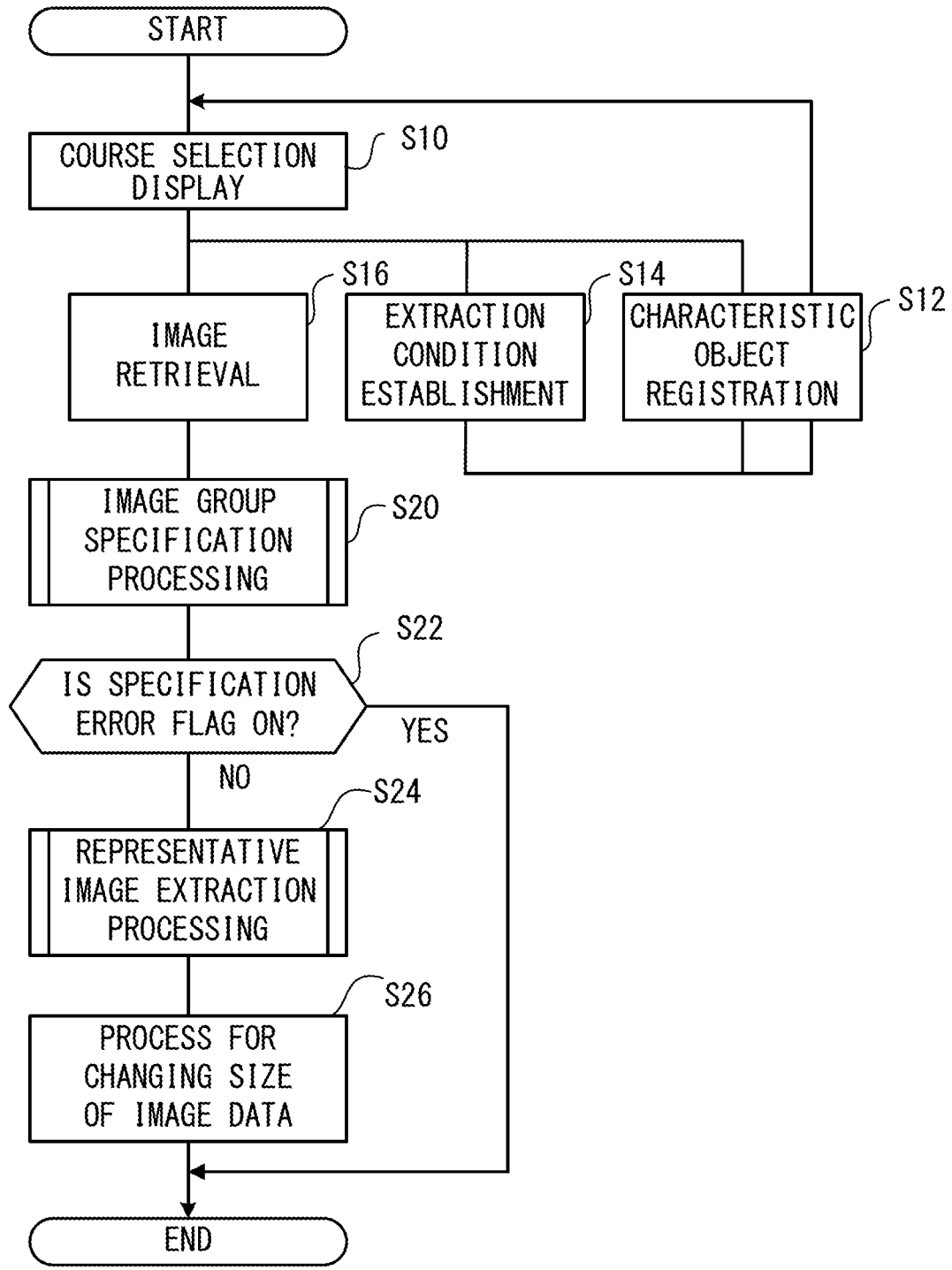
FIG. 6 is a flowchart of image retrieval processing according to the first embodiment.

FIG. 6 is a flowchart illustrating the entire procedure of image retrieval processing according to the first embodiment. The image retrieval apparatus 110 displays three courses, image retrieval, extraction condition establishment, and characteristic object registration, on the display unit 70 when the image retrieval processing is started (step S10), and causes a photographer to select a course. When characteristic object registration is selected, the image retrieval apparatus 110 causes the characteristic object registration unit 310 to perform a process for registering a characteristic object (step S12). As an example, in the process for registering a characteristic object, a photographer sequentially photographs the first characteristic object and the second characteristic object by using the camera 5 in a situation different from a series of photographing operations. The characteristic object registration unit 310 registers characteristic object images obtained by respectively photographing the first characteristic object and the second characteristic object, and characteristic data in the memory 40.

When extraction condition establishment is selected, the image retrieval apparatus 110 causes the extraction condition establishment unit 410 to perform a process for establishing an extraction condition (step S14). FIG. 7 illustrates an example of an extraction condition establishing screen displayed on the display unit 70 of the information processing apparatus 6. The extraction condition establishing screen is a screen on which the ON/OFF states of extraction condition modes such as a most frequent image and the priority orders of the respective modes are set.

A screen 70a of the display unit 70 indicates a state in which the most frequent image has been set to the ON state, the most appropriate exposure has been set to the OFF state, blurring detection has been set to the OFF state, and focusing detection has been set to the OFF state. According to the settings on the screen 70a, the most frequent image score calculation unit 420 is enabled, but the exposure score calculation unit 430, the subject blurring score calculation unit 440, and the focusing score calculation unit 450 are disabled.

A screen 70b indicates a state in which the most frequent image has been set to the ON state, the most appropriate exposure has been set to the OFF state, blurring detection has been set to the ON state, and focusing detection has been set to the OFF state. The most frequent image score calculation unit 420 and the subject blurring score calculation unit 440 are enabled, but the exposure score calculation unit 430 and the focusing score calculation unit 450 are disabled.

A screen 70c indicates a state in which priority orders have been set. The screen 70c indicates a state in which the most frequent image has been set to priority order 1, the most appropriate exposure has been set to the OFF state, blurring detection has been set to priority order 3, and focusing detection has been set to priority order 2. A maximum weight is applied to a score of the most frequent image score calculation unit 420 with priority order 1, the second weight is applied to a score of the focusing score calculation unit 450, and the third weight is applied to the subject blurring score calculation unit 440. As an example, a most frequent image score is tripled, a focusing score is doubled, and a subject blurring score is not changed (1 time). The exposure score calculation unit 430 is disabled.

Return now to FIG. 6. When image retrieval is selected, the image retrieval apparatus 110 starts an image retrieval process (step S16). The image group processing unit 130 performs image group specification processing (step S20).

Figure 8:
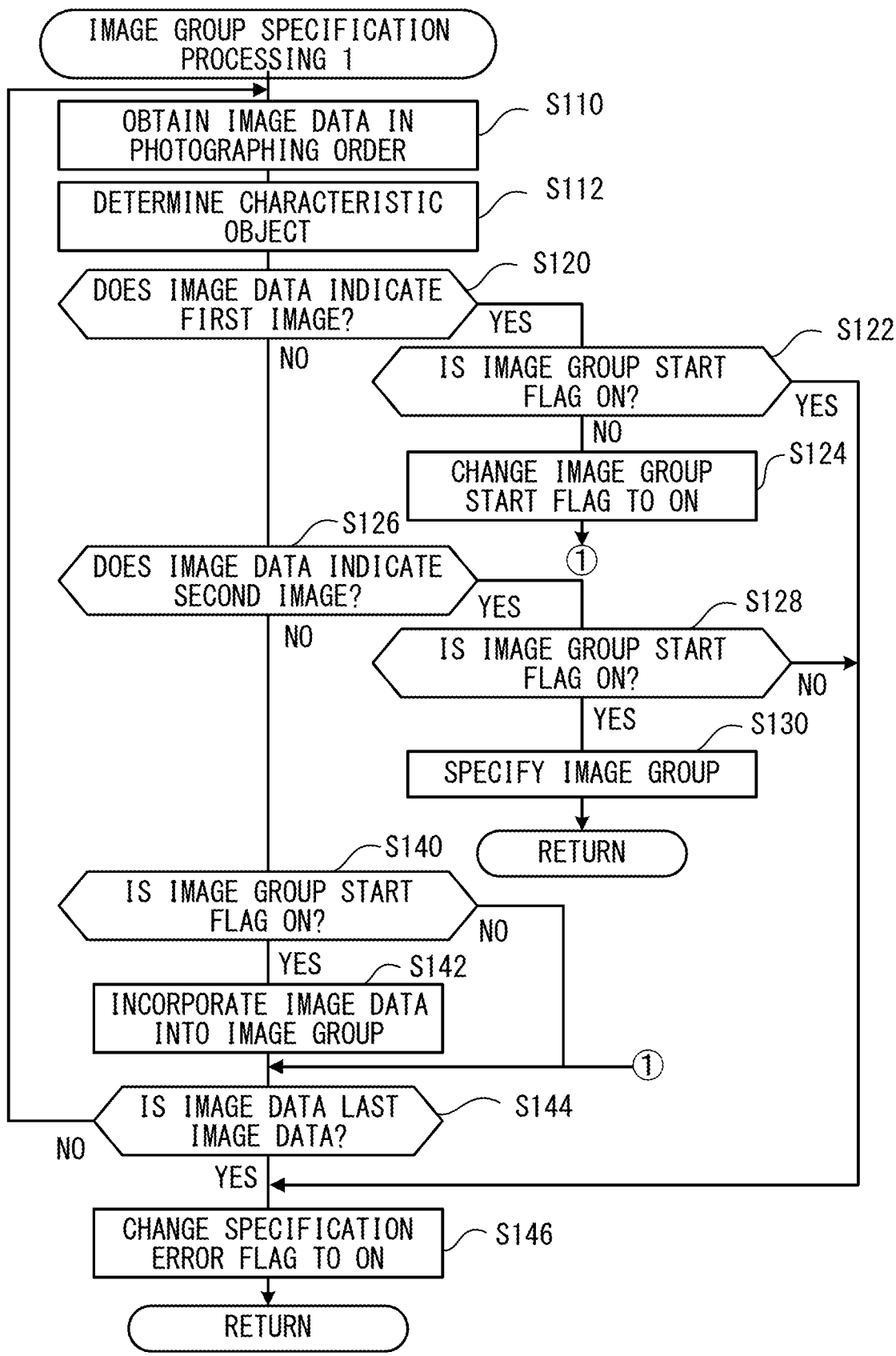
FIG. 8 illustrates a subroutine of image group specification processing 1 according to the first embodiment.

FIG. 8 is a flowchart explaining a procedure of image group specification processing 1. The image retrieval control unit 120 obtains image data of one captured image stored in the storage 60 at a time in order of earliness of a photographing date (in photographing order) (step S110). In the example of FIG. 5, image data of image D1 is obtained. The determination unit 320 determines whether the obtained image data includes a characteristic object (step S112). The determination unit 320 determines whether the obtained image data indicates the first image including the first characteristic object (step S120).

When the determination unit 320 determines that the obtained image data indicates the first image (YES in step S120), the image group specification unit 330 determines whether an image group start flag is ON (step S122). The image group start flag is a flag indicating the start of an image group, and when it is determined that the obtained image data indicates the first image, the image group start flag is changed from OFF to ON, and when it is determined that the obtained image data indicates the second image, the image group start flag is changed from ON to OFF.

When the image group specification unit 330 determines that the image group start flag is ON (YES in step S122), the image group specification unit 330 changes a specification error flag to ON (step S146). The specification error flag is a flag indicating that an error has been generated in image group specification. It is determined that another first image has appeared in a state in which the image group start flag is ON, and therefore the image group specification unit 330 determines that an error has been generated.

When the image group specification unit 330 determines that the image group start flag is not ON (NO in step S122), the image group specification unit 330 changes the image group start flag to ON (Step S124), and the processing moves on to step S144. In the example of FIG. 5, the image group start flag is changed to ON as a result of a process for determining image D2.

When the determination unit 320 determines that the image data does not indicate the first image (NO in step S120), the determination unit 320 determines whether the image data indicates the second image including the second characteristic object (step S126). When the determination unit 320 determines that the image data indicates the second image (YES in step S126), the image group specification unit 330 determines whether the image group start flag is ON (step S128). When the image group specification unit 330 determines that the image group start flag is not ON (NO in step S128), the processing moves on to step S146. It is determined that the second image has appeared before the first image appears, and therefore the image group specification unit 330 determines that an error has been generated.

When the image group specification unit 330 determines that the image group start flag is ON (YES in step S128), the image group specification unit 330 specifies an image group (step S130), and changes the image group start flag to OFF. This is because the first characteristic object and the second characteristic object are detected and images between the first image and the second image that correspond to the first characteristic object and the second characteristic object can be specified as an image group. In the example of FIG. 5, image D3 to image D11 are specified as an image group as a result of a process for determining that image D12 is the second image. The processing moves on to step S22 in the flowchart of FIG. 6.

When the determination unit 320 determines that the image data does not indicate the second image (NO in step S126), the image group specification unit 330 determines whether the image group start flag is ON (step S140). When the image group specification unit 330 determines that the image group start flag is ON (YES in step S140), the image group specification unit 330 incorporates the image data into the image group (step S142). This is because the image data indicates an image after the first image, and does not indicate a characteristic image, and because it is determined that the image data indicates a target object image to be included in the image group. When the image group specification unit 330 determines that the image group start flag is not ON (NO in step S140), the processing moves on to step S144. This is because, in this case, the image data is determined to be an image that is not included in the image group.

The image retrieval control unit 120 determines whether the image data is the last image data in photographing order (step S144). When the image retrieval control unit 120 determines that the determined image data is not the last image data in photographing order (NO in step S144), the processing returns to step S110.

When the image retrieval control unit 120 determines that the determined image data is the last image data in photographing order (YES in step S144), the processing moves on to step S146. This is because a pair of the first image and the second image has not been detected in a process of a series of image data. After step S146, the processing of the image retrieval control unit 120 moves on to step S22 in the flowchart of FIG. 6.

The image retrieval control unit 120 determines whether the specification error flag is ON (step S22). When the image retrieval control unit 120 determines that the specification error flag is not ON (NO in step S22), the image retrieval control unit 120 causes the representative image extraction unit 140 to perform representative image extraction processing (step S24).

Figure 9:
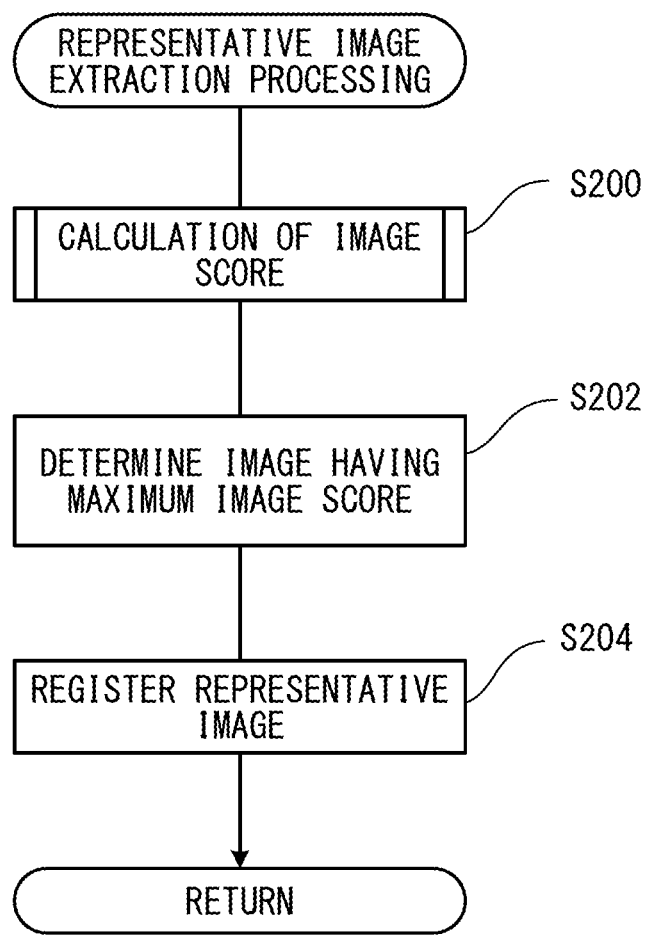
FIG. 9 illustrates a subroutine of representative image extraction processing according to the first embodiment.

FIG. 9 illustrates a subroutine illustrating a procedure of representative image extraction processing. The representative image extraction unit 140 performs the representative image extraction processing. The representative image extraction unit 140 calculates an image score (step S200).

Figure 10:
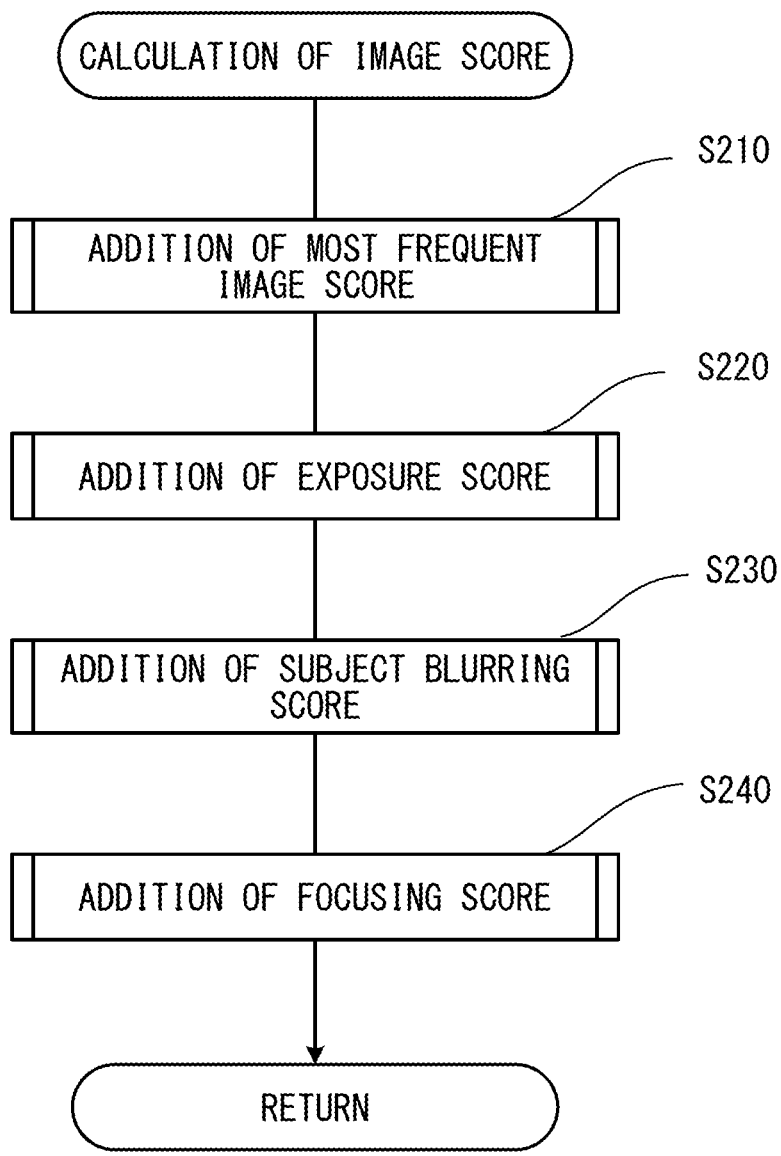
FIG. 10 illustrates a subroutine of image score calculation processing according to the first embodiment.

FIG. 10 illustrates a subroutine illustrating a procedure of image score calculation processing. The image score calculation processing is configured by respective processes for adding a most frequent image score (step S210), adding an exposure score (step S220), adding a subject blurring score (step S230), and adding a focusing score (step S240). The respective addition processes are sequentially described. Note that the respective addition processes may be performed in an arbitrary order.

Figure 11:
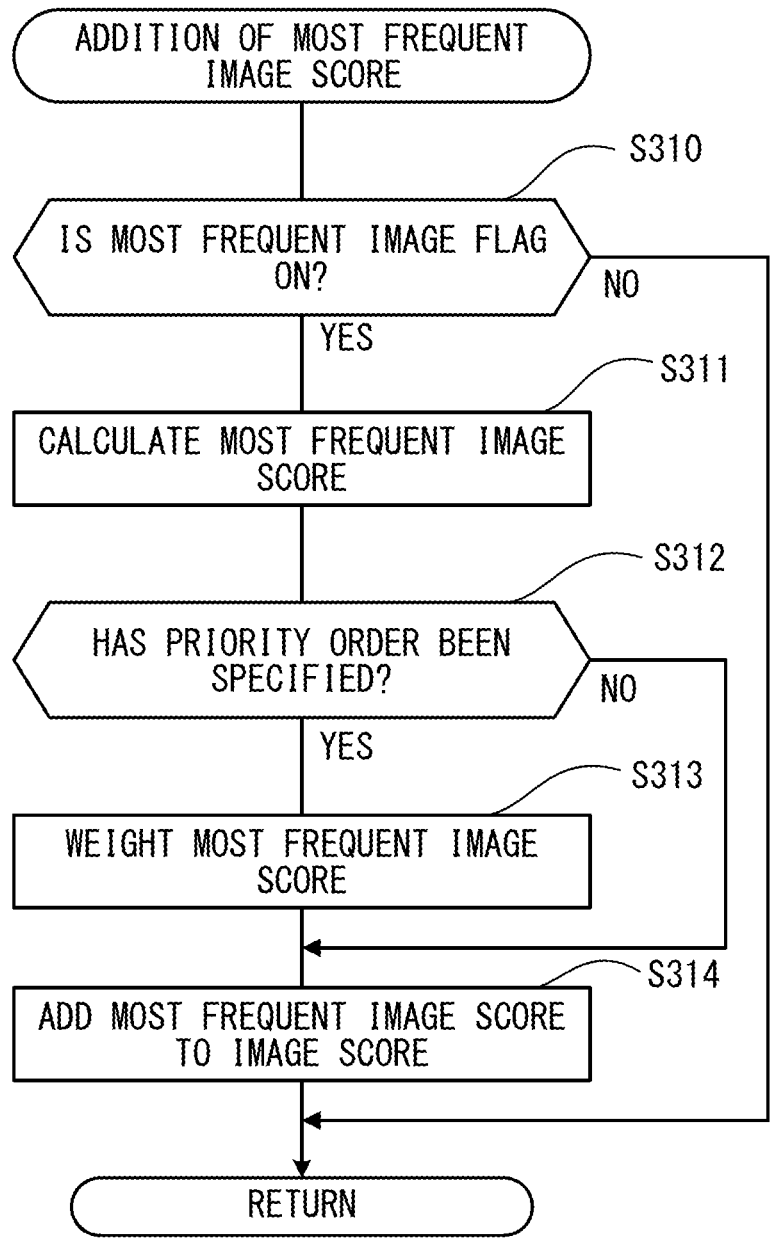
FIG. 11 illustrates a subroutine of most frequent image score addition processing according to the first embodiment.

FIG. 11 illustrates a subroutine illustrating a procedure of most frequent image score adding processing. The most frequent image score calculation unit 420 determines whether a most frequent image flag is ON (step S310). As illustrated in FIG. 7, when the most frequent image has been set to ON in the representative image extraction condition, the most frequent image flag is ON.

When the most frequent image score calculation unit 420 determines that the most frequent image flag is ON (YES in step S310), the most frequent image score calculation unit 420 calculates a most frequent image score for each of the images included in the specified image group. As described above, the most frequent image score calculation unit 420 groups images that have a similar shape and composition of a main subject from among the images in the specified image group, and calculates the most frequent image score such that images that belong to a group including a large number of images have a high score (step S311).

The most frequent image score calculation unit 420 determines whether a priority order has been specified for the most frequent image (step S312). When the most frequent image score calculation unit 420 determines that the priority order has been specified for the most frequent image (YES in step S312), the most frequent image score calculation unit 420 applies a prescribed weight to the most frequent image score calculated in step S311 (step S313). As described above, when priority order 1 has been specified, the score calculated in step S311 is tripled, for example.

When the most frequent image score calculation unit 420 determines that a priority order has not been specified for the most frequent image (NO in step S312), the processing moves on to step S314. The most frequent image score calculation unit 420 adds the most frequent image score in step S311 or the most frequent image score weighted in step S313 to the image score (step S314). After the process of step S314, or after the most frequent image score calculation unit 420 determines that the most frequent image flag is not ON (NO in step S310), the most frequent image score calculation unit 420 finishes the processing of FIG. 11, and the processing moves on to step S220 of FIG. 10.

Figure 12:
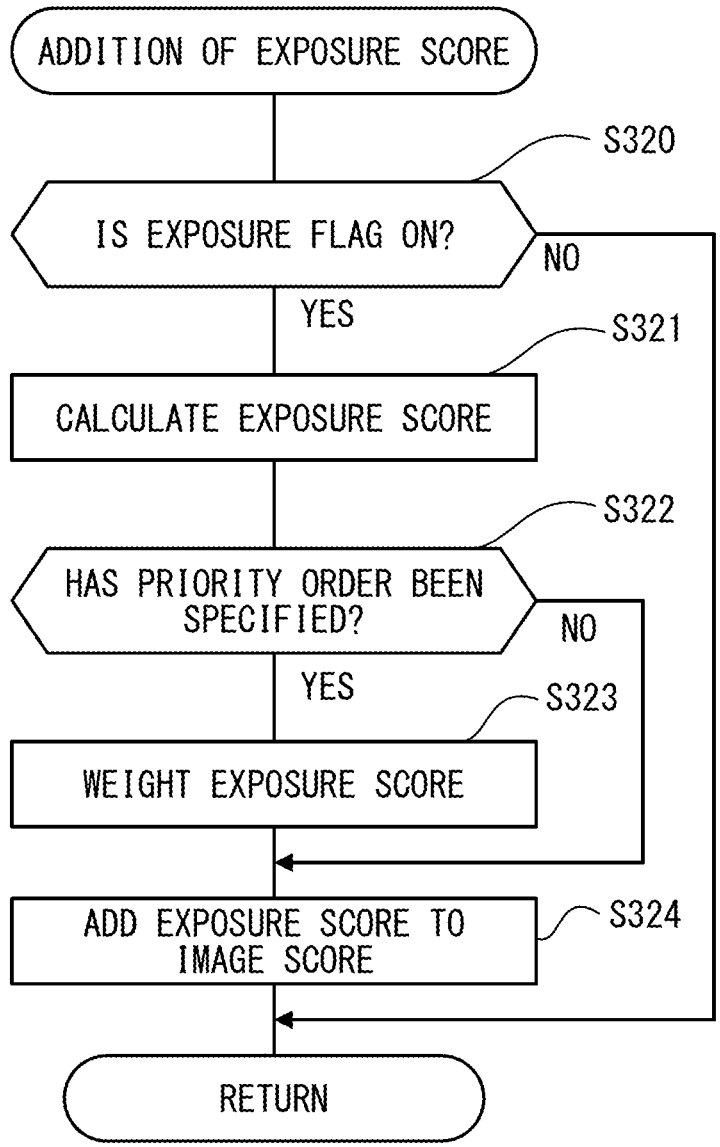
FIG. 12 illustrates a subroutine of exposure score addition processing according to the first embodiment.

FIG. 12 illustrates a subroutine illustrating a procedure of exposure score addition processing. The exposure score calculation unit 430 determines whether an exposure flag is ON (step S320). As illustrated in FIG. 7, when a most appropriate exposure has been set to ON in the representative image extraction condition, the exposure flag is ON. When the exposure score calculation unit 430 determines that the exposure flag is ON (YES in step S320), the exposure score calculation unit 430 calculates an exposure score for each of the images included in the specified image group in accordance with a degree of appropriateness of an exposure (step S321).

The exposure score calculation unit 430 determines whether a priority order has been specified for the most appropriate exposure (step S322). When the exposure score calculation unit 430 determines that a priority order has been specified for the most appropriate exposure (YES in step S322), the exposure score calculation unit 430 applies a prescribed weight to the exposure score calculated in step S321 (step S323).

When the exposure score calculation unit 430 determines that a priority order has not been specified for the most appropriate exposure (NO in step S322), the processing moves on to step S324. The exposure score calculation unit 430 adds the exposure score or the weighted exposure score to the image score (step S324). After the process of step S324, or after the exposure score calculation unit 430 determines that the exposure flag is not ON (NO in step S320), the exposure score calculation unit 430 finishes the processing of FIG. 12, and the processing moves on to step S230 in FIG. 10.

Figure 13:
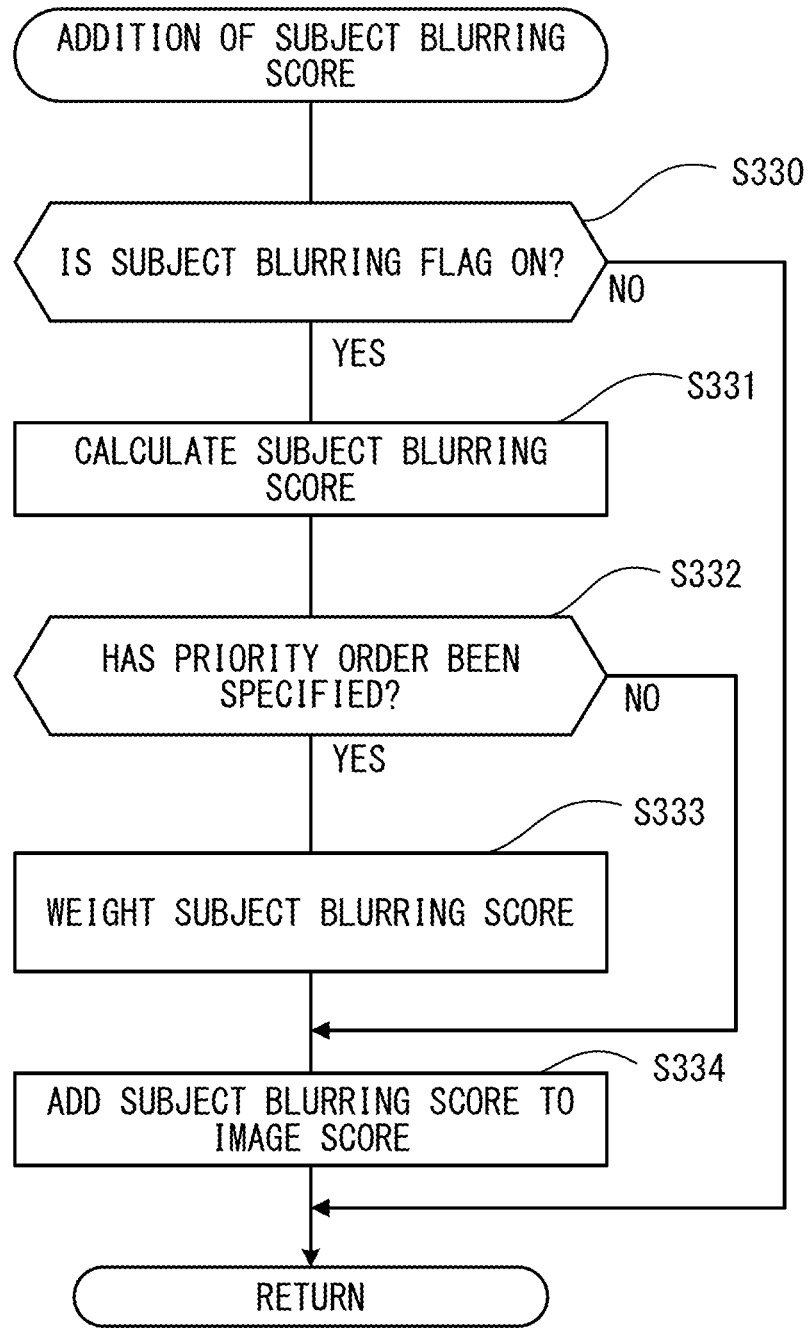
FIG. 13 illustrates a subroutine of subject blurring score addition processing according to the first embodiment.

FIG. 13 illustrates a subroutine illustrating a procedure of subject blurring score addition processing. The subject blurring score calculation unit 440 determines whether a subject blurring flag is ON (step S330). As illustrated in FIG. 7, when blurring detection has been set to ON in the representative image extraction condition, the subject blurring flag is ON. When the subject blurring score calculation unit 440 determines that the subject blurring flag is ON (YES in step S330), the subject blurring score calculation unit 440 calculates a subject blurring score for each of the images included in the specified image group (step S331).

The subject blurring score calculation unit 440 determines whether a priority order has been specified for blurring detection (step S332). When the subject blurring score calculation unit 440 determines that a priority order has been specified for the blurring detection (YES in step S332), the subject blurring score calculation unit 440 applies a prescribed weight to the subject blurring score calculated in step S331 (step S333).

When the subject blurring score calculation unit 440 determines that a priority order has not been specified for the subject blurring (NO in step S332), the processing moves on to step S334. The subject blurring score calculation unit 440 adds the subject blurring score or the weighted subject blurring score to the image score (step S334). After the process of step S334, or after the subject blurring score calculation unit 440 determines that the subject blurring flag is not ON (NO in step S330), the subject blurring score calculation unit 440 finishes the processing of FIG. 13, and the processing moves on to step S240 in FIG. 10.

FIG. 14 illustrates a subroutine illustrating a procedure of focusing score addition processing. The focusing score calculation unit 450 determines whether a focusing flag is ON (step S340). As illustrated in FIG. 7, when focusing detection has been set to ON in the representative image extraction condition, the focusing flag is ON. When the focusing score calculation unit 450 determines that the focusing flag is ON (YES in step S340), the focusing score calculation unit 450 calculates a focusing score for each of the images included in the specified image group (step S341).

The focusing score calculation unit 450 determines whether a priority order has been specified for the focusing detection (step S342). When the focusing score calculation unit 450 determines that a priority order has been specified for the focusing detection (YES in step S342), the focusing score calculation unit 450 applies a prescribed weight to the focusing score calculated in step S341 (step S343).

When the focusing score calculation unit 450 determines that a priority order has not been specified for the focusing detection (NO in step S342), the processing moves on to step S344. The focusing score calculation unit 450 adds the focusing score or the weighted focusing score to the image score (step S344). After the process of step S344, or after the focusing score calculation unit 450 determines that the focusing flag is not ON (NO in step S340), the focusing score calculation unit 450 finishes the processing of FIG. 14, and the processing returns to FIG. 10. The processing moves on from FIG. 10 to step S202 in FIG. 9.

The representative image extraction unit 140 determines an image having a maximum image score from among images in the specified image group (step S202). An example of calculated scores of respective modes is illustrated in FIG. 15 in the form of a table. The scores in FIG. 15 are examples of scores calculated for image D3 to image D11 illustrated in FIG. 5. When a photographing environment is a dark place, the representative image extraction unit 140 may prioritize an amount of blurring of a subject over a degree of focusing of the subject. This example illustrates a case in which all flags of the most frequent image, the most appropriate exposure, the blurring detection, and the focusing detection are ON. In addition, assume that priority orders are not specified.

Most frequent image scores, exposure scores, subject blurring scores, and focusing scores that are calculated for image D3 to image D11 are illustrated. As an example, with respect to the most frequent image score, low scores are calculated for images D3, D4, and D5, and high scores are calculated for image D7 to image D11 having the same composition. With respect to the exposure score, low scores are calculated for overexposure image D9 and underexposure image D11. A total image score is illustrated in a field indicating a total score. In the example of FIG. 15, image D10 for which a total image score is 36 is extracted as a representative image by the representative image extraction unit 140.

The image retrieval control unit 120 registers the image determined in step S202 as a representative image (step S204). Specifically, the image retrieval control unit 120 controls the image management device 100 to allocate a portion of a tag of image data to image retrieval data, and to write information indicating a representative image to the image retrieval data of the tag for the image data that has been determined as a representative image.

In addition, the image retrieval control unit 120 may control the image management device 100 to write information indicating a common image group to image retrieval data of a tag of each image data, for image data specified as an image group. Further, the image retrieval control unit 120 may control the image management device 100 to manage plural pieces of image data specified as an image group as one holder in the storage 60.

After the representative image extraction processing is finished, the processing returns to the flowchart of FIG. 6. The image retrieval control unit 120 issues an instruction to perform a process for changing the size of image data (step S26). The image retrieval control unit 120 issues, to the image management device 100, an instruction to reduce the size of image data of a characteristic object image. This is because the characteristic object image is an image for delimiting, and because a small-size image is sufficient for the characteristic object image. In order to reduce the size of data, the number of pixels may be reduced, or a compression ratio may be increased.

In addition, the image retrieval control unit 120 may issue, to the image management device 100, an instruction to convert image data of a target object image (or an image in an image group) so as to have a size that conforms to a prescribed standard. The prescribed standard is a standard that is defined for documents or data to be submitted to public institutions or national agencies. In a case in which image data that conforms to the prescribed standard is obtained from the camera 5, conversion to the prescribed standard is not performed. The image management device 100 converts image data of a characteristic object image and a target object image that has been stored in the storage 60 so as to have a size instructed by the image retrieval control unit 120.

After the image retrieval processing is finished, the image management device 100 transmits image data of a series of captured images that has been stored in the storage 60 to the server 8. The image management device 100 may transmit only the image data of the target object image excluding the image data of the characteristic object image to the server 8. Further, the image management device 100 may transmit only image data of a representative image to the server 8. By not transmitting unneeded image data, a communication time and a load on the server 8 can be reduced.

As described above, by employing the image retrieval apparatus according to the first embodiment, a series of captured images can be easily divided according to the intention of a photographer by performing a simple operation to photograph a specific subject. Specifically, in a case in which the number of portion of constructions that are targets to be photographed is large, as in construction photographing, and captured images need to be managed by dividing the captured images into images for each of the portion of constructions, the captured images can be easily divided by specifying plural images captured in each of the portion of constructions as an image group. By extracting a representative image from the specified image group according to a prescribed condition, an appropriate image can be easily selected from the plural images captured in each of the portion of constructions.

Second Embodiment

A second embodiment is described next. In the second embodiment, an image group specified in the first embodiment is divided into image subgroups by further photographing the third characteristic object, as described above. The second embodiment is applied to a case in which an image group is desired to be divided into several groups. In the field of construction photographing, for example, the second embodiment is effective for photographing for recording in a painting operation configured by plural processes, as described below.

Figure 16:
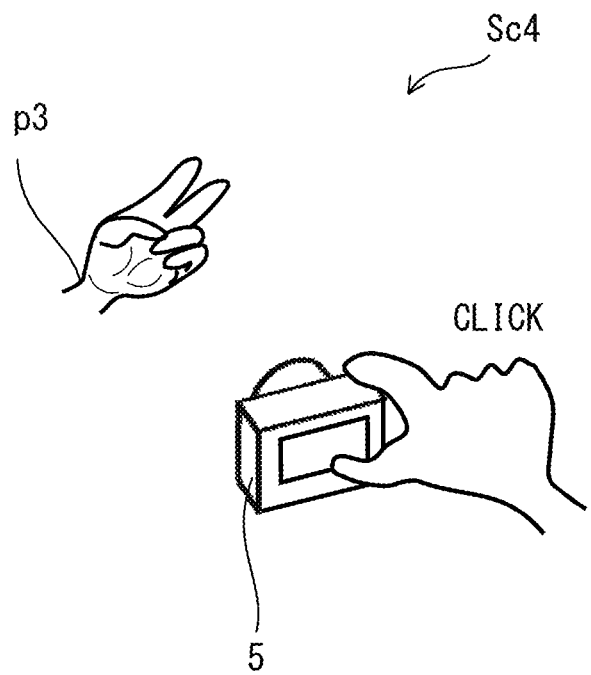
FIG. 16 illustrates an example of a photographing situation of a third characteristic object according to a second embodiment.

FIG. 16 illustrates an example of photographing situation Sc4 of the third characteristic object. In the second embodiment, assume that a "hand forming a V-mark" is the third characteristic object p3. Also assume that the first characteristic object p1 and the second characteristic object p2 are the same as those in the first embodiment.

Figure 17:
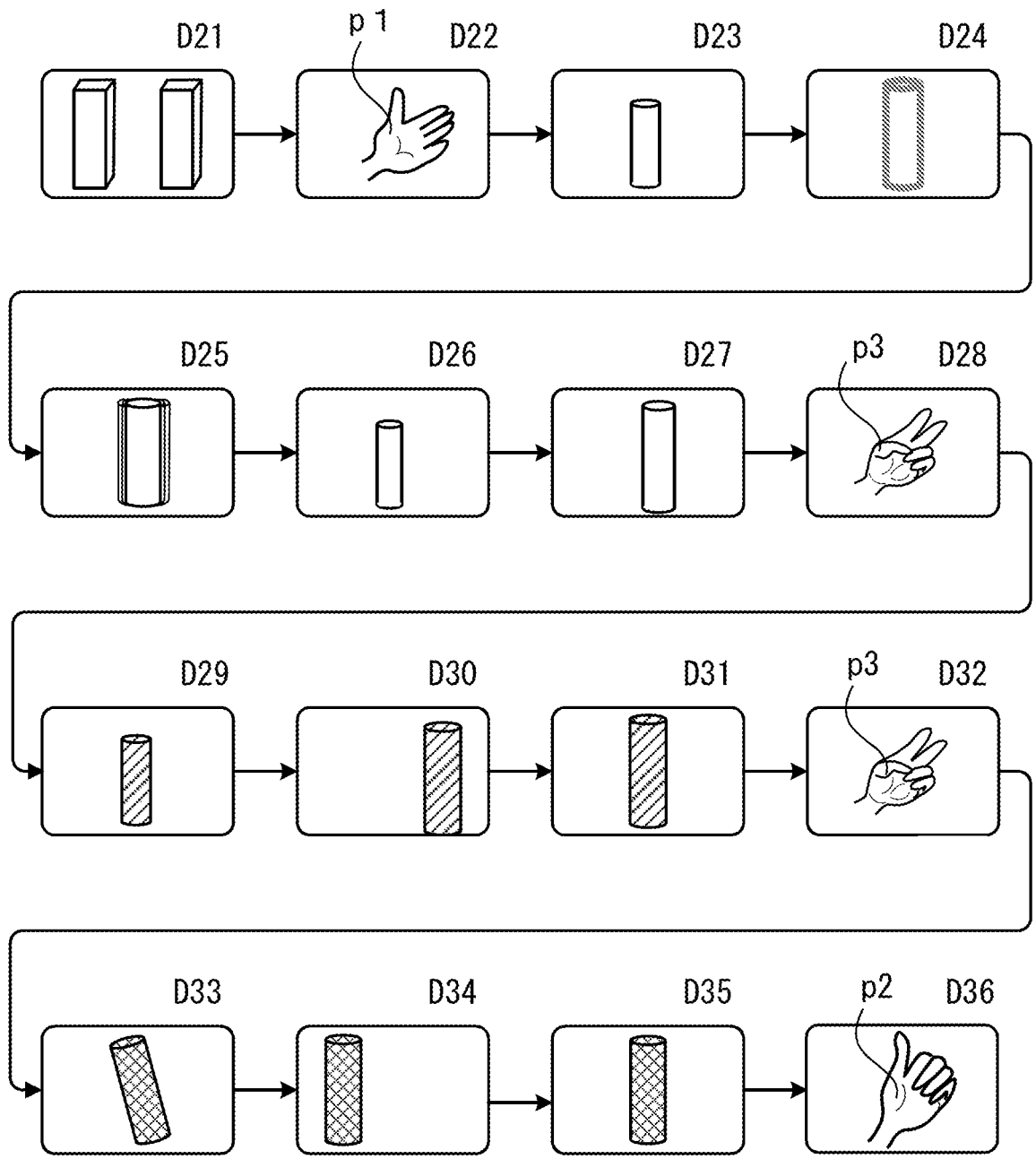
FIG. 17 illustrates an example of a series of captured images according to the second embodiment.

FIG. 17 is a diagram in which image D21 to image D36 captured in a series of photographing operations are arranged in order of earliness of a photographing date (in photographing order) according to the second embodiment. Image D21 is an image that is captured first, and image D36 is an image that is captured last. Images in FIG. 17 are images obtained by photographing gradual painting, so-called plural-time painting. In order to leave records of respective painting stages, photographing is performed in each of the painting stages. The example of FIG. 17 is an example in which three-stage painting is photographed.

Image D21 is an image of trial photographing. Image D22, which is the first image including the first characteristic object p1, is captured as an image indicating a start position of an image group. As a record of the first stage of painting, image D23 to image D27 are captured. Between a first-stage record and a second-stage record, image D28, which is the third image, is captured as an image indicating a delimiting position in the middle of the image group. Then, image D29 to image D31 are captured as a record of the second stage of painting.

Between the second-stage record and a third-stage record, image D32, which is the third image, is captured as an image indicating a delimiting position in the middle of the image group. Then, image D33 to image D35 are captured as a record of the third stage of painting. Image D36, which is the second image including the second characteristic object p2, is captured as an image indicating an end position of the image group. As described above, by photographing the third characteristic object, a series of captured images are divided in such a way that image D23 to image D27 are classified into image subgroup 1, that image D29 to image D31 are classified into image subgroup 2, and that image D33 to image D35 are classified into image subgroup 3.

Figure 18:
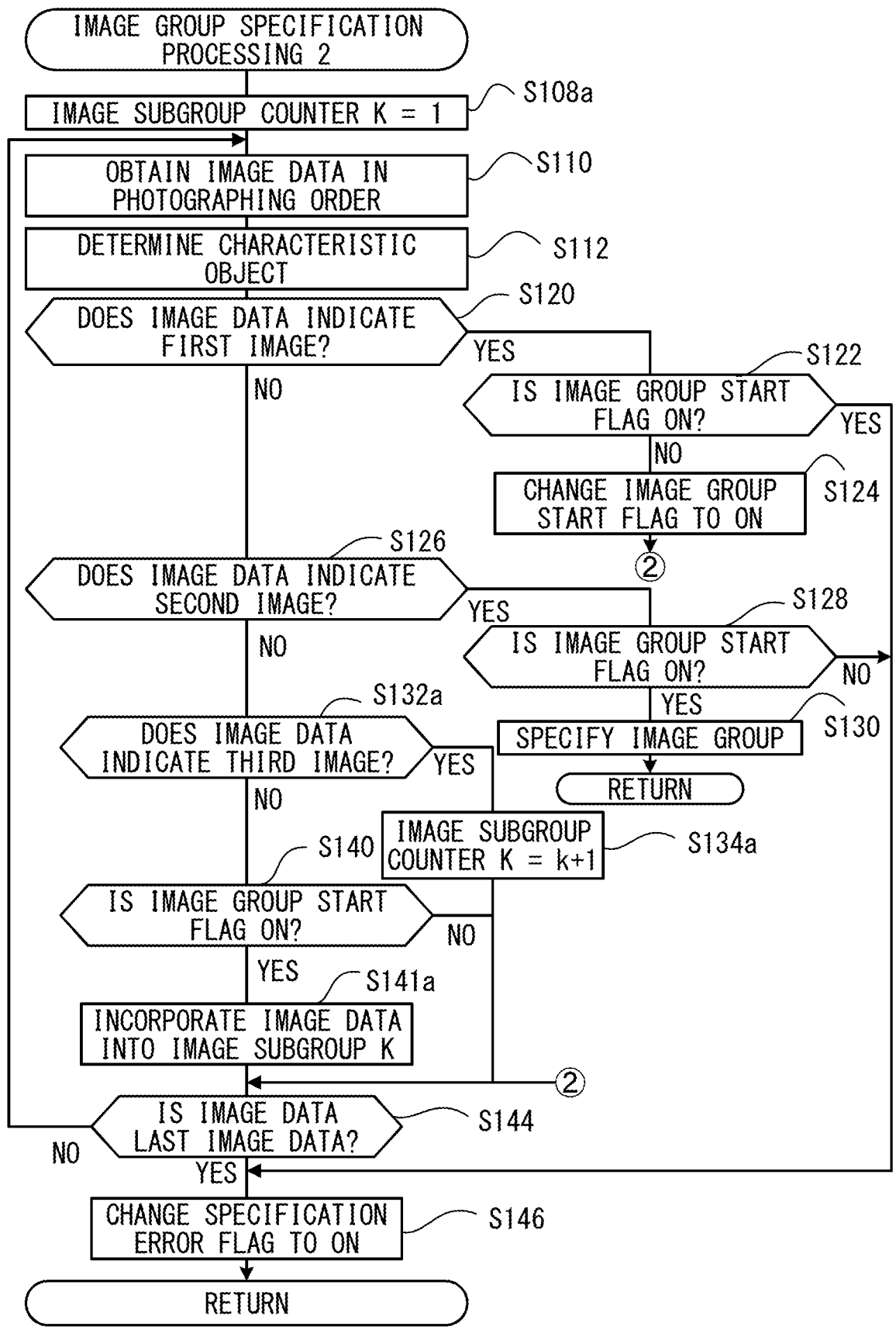
FIG. 18 illustrates a subroutine of image group specification processing 2 according to the second embodiment.

Image retrieval processing according to the second embodiment is described. The entire procedure of the image retrieval processing according to the second embodiment is the same as the flowchart of FIG. 6 in the first embodiment, and its description is omitted. FIG. 18 is a flowchart explaining a procedure of image group specification processing (image group specification processing 2) according to the second embodiment. The image group specification processing 2 includes a large portion common to the image group specification processing (the image group specification processing 1) according to the first embodiment illustrated in FIG. 8, and therefore common processes will be described by using the same reference numerals. In the description below, differences from the image group specification processing 1 will be principally described, and the description of the common processes will be omitted in principle. In addition, assume that the third characteristic object is registered by the characteristic object registration unit 310, similarly to the first characteristic object and the like described above.

The image group specification unit 330 changes an image subgroup counter K such that K=1 (step S108a). The image subgroup counter K is an integer (K=1, 2, ... ), and indicates a group number of an image subgroup. Step S110 to step S130 are similar to those in the flowchart of FIG. 8. In step S130, the image group specification unit 330 further changes the image group start flag to OFF, and clears the image subgroup counter K to 0. The determination unit 320 determines whether obtained image data indicates the third image including the third characteristic object (step S132a).

When the determination unit 320 determines that the obtained image data indicates the third image (YES in step S132a), the image group specification unit 330 changes the image subgroup counter K such that K=K+1 (step S134a), and the processing moves on to step S144.

When the determination unit 320 determines that the obtained image data does not indicate the third image (NO in step S132a), the image group specification unit 330 determines whether the image group start flag is ON (step S140). When the image group specification unit 330 determines that the image group start flag is ON (YES in step S140), the image group specification unit 330 incorporates the image data into image subgroup K (step S141a). This is because the first image has already been detected and it is determined that the image data indicates a target image included in image subgroup K.

When the image group specification unit 330 determines that the image group start flag is not ON (NO in step S140), the processing moves on to step S144. As a result of the processing above, an image group including a series of captured images can be divided into image subgroups in a position whether the third image is detected. Step S144 and step S146 are similar to those in FIG. 8, and the description thereof is omitted.

Representative image extraction processing is performed on each of the detected image subgroups. The specific content of the representative image extraction processing is the same of the processing in FIG. 9 to FIG. 14 described in the first embodiment, and its description is omitted. In the example of FIG. 17, as an example, image D27, image D31, image D35 are respectively extracted as representative images from image subgroup 1, image subgroup 2, and image subgroup 3.

As described above, by further providing the third image in addition to the first image and the second image, an image group can be divided into image subgroups. Consequently, one process can be further divided into plural halfway processes, and a representative image can be extracted in each of the halfway processes.

Third Embodiment

A third embodiment is described next. In the third embodiment, the start and end of retrieval processing for specifying an image group, namely, positions in which image group specification processing is started and finished are specified by photographing the fourth and fifth characteristic objects, as described above. The fourth image is an image indicating a start position of the image group specification processing, and the fifth image is an image indicating an end position of the image group specification processing. Images between the fourth image and the fifth image are also referred to as target images in the retrieval processing.

Figure 19:
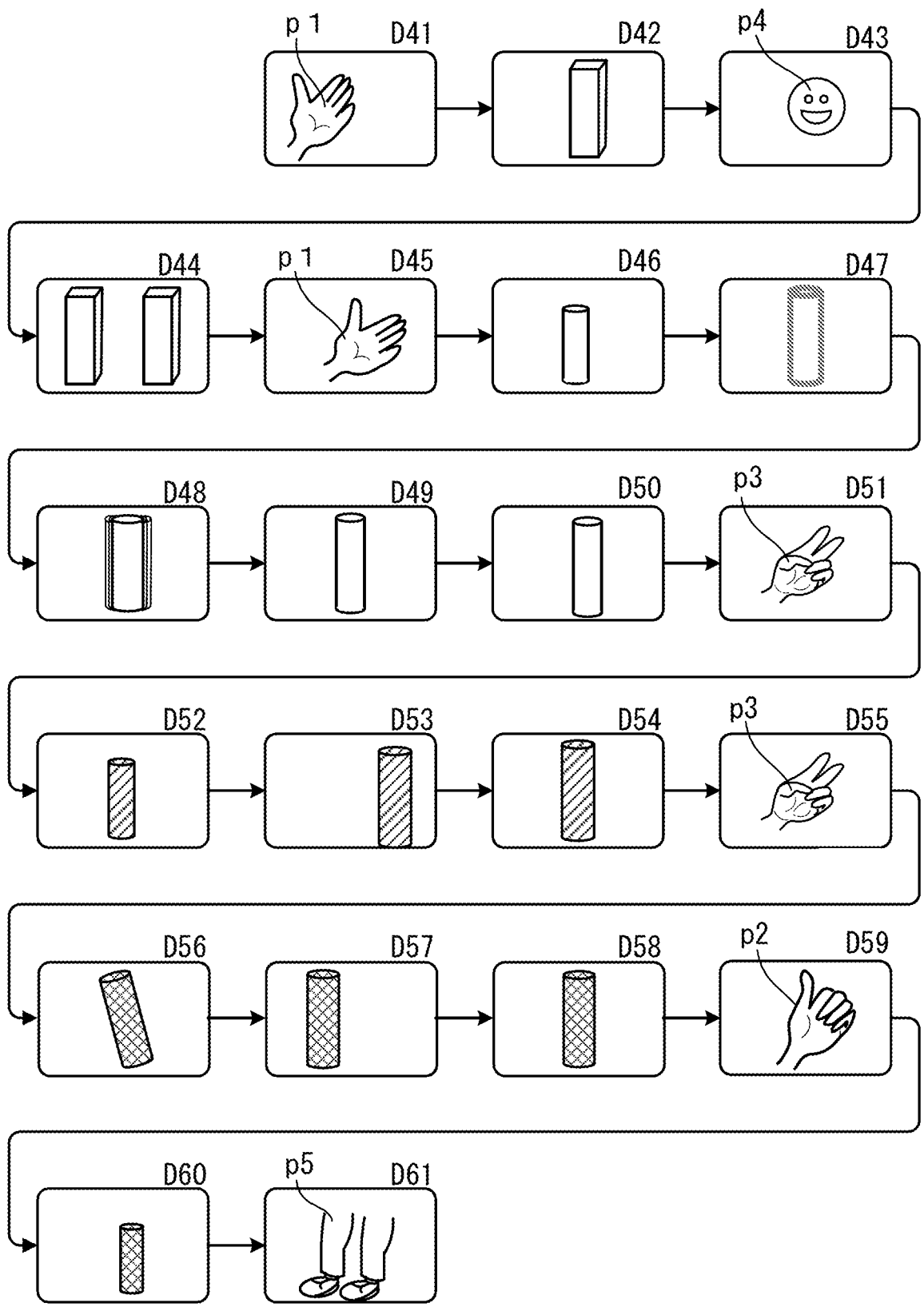
FIG. 19 illustrates an example of a series of captured images according to a third embodiment.

FIG. 19 is a diagram in which image D41 to image D61 captured in a series of photographing operations are arranged in order of earliness of a photographing timing according to the third embodiment. Image D41 is an image that is captured first, and image D61 is an image that is captured last. In this example, assume that the fourth characteristic object p4 is a person's face, and that the fifth characteristic object p5 is a lower body of a person. It is also assumed that the first characteristic object p1, the second characteristic object p2, and the third characteristic object p3 are the same as those in the second embodiment.

Image D41 and image D45 are the first images obtained by photographing the first characteristic object p1. Image D59 is the second image obtained by photographing the second characteristic object p2. Image D51 and image D55 are the third images obtained by photographing the third characteristic object p3. Image D43 is the forth image obtained by photographing the fourth characteristic object p4, and image D61 is the fifth image obtained by photographing the fifth characteristic object p5.

Figure 20:
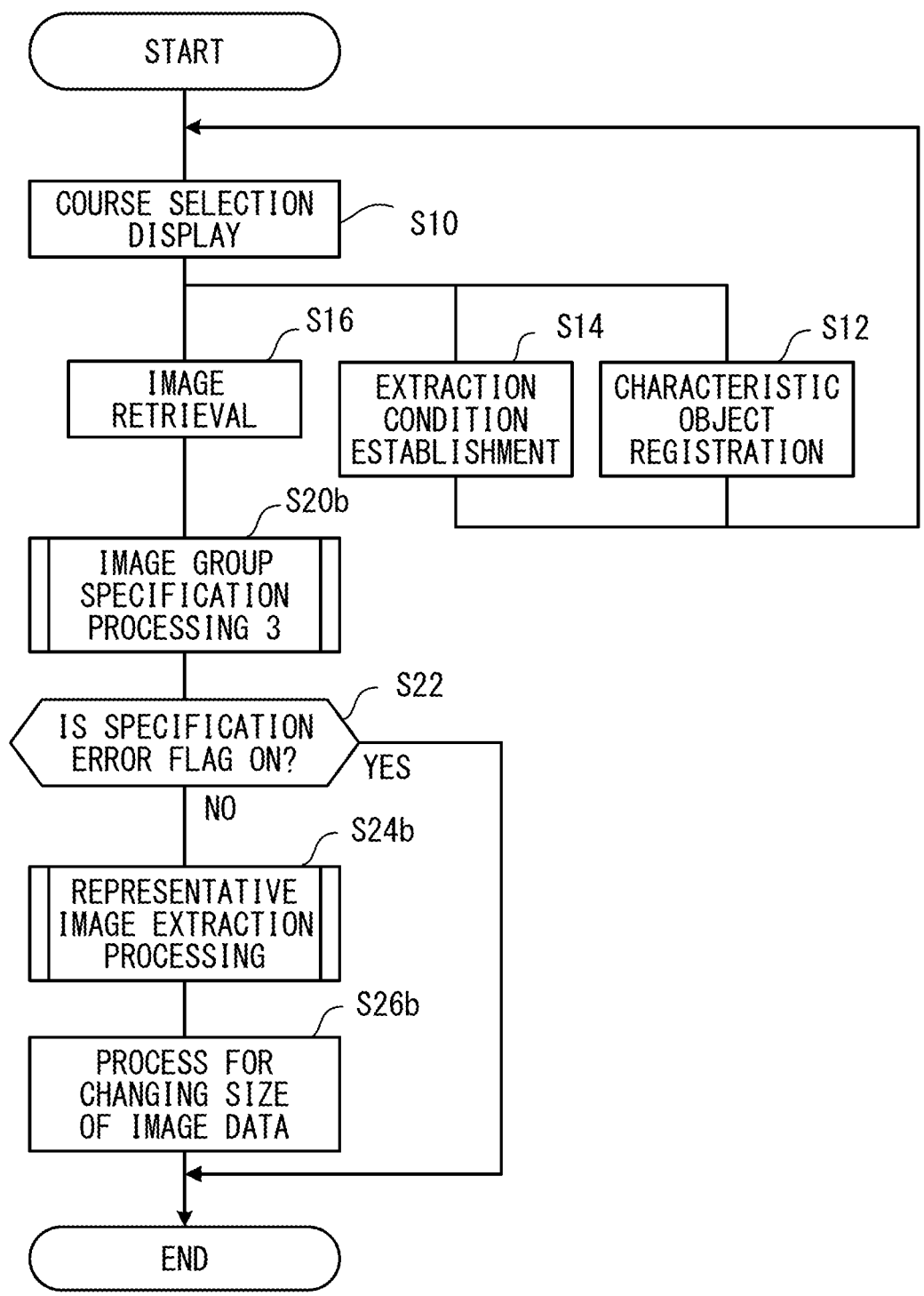
FIG. 20 is a flowchart of image retrieval processing according to the third embodiment.

FIG. 20 is a flowchart illustrating the entire procedure of image retrieval processing according to the third embodiment. The image retrieval processing according to the third embodiment includes a large portion common to the image retrieval processing according to the first embodiment described with reference to the flowchart of FIG. 6, and therefore common processes will be described by using the same reference numerals. In the description below, differences will be principally described, and the description of the common processes will be omitted in principle.

Figure 21:
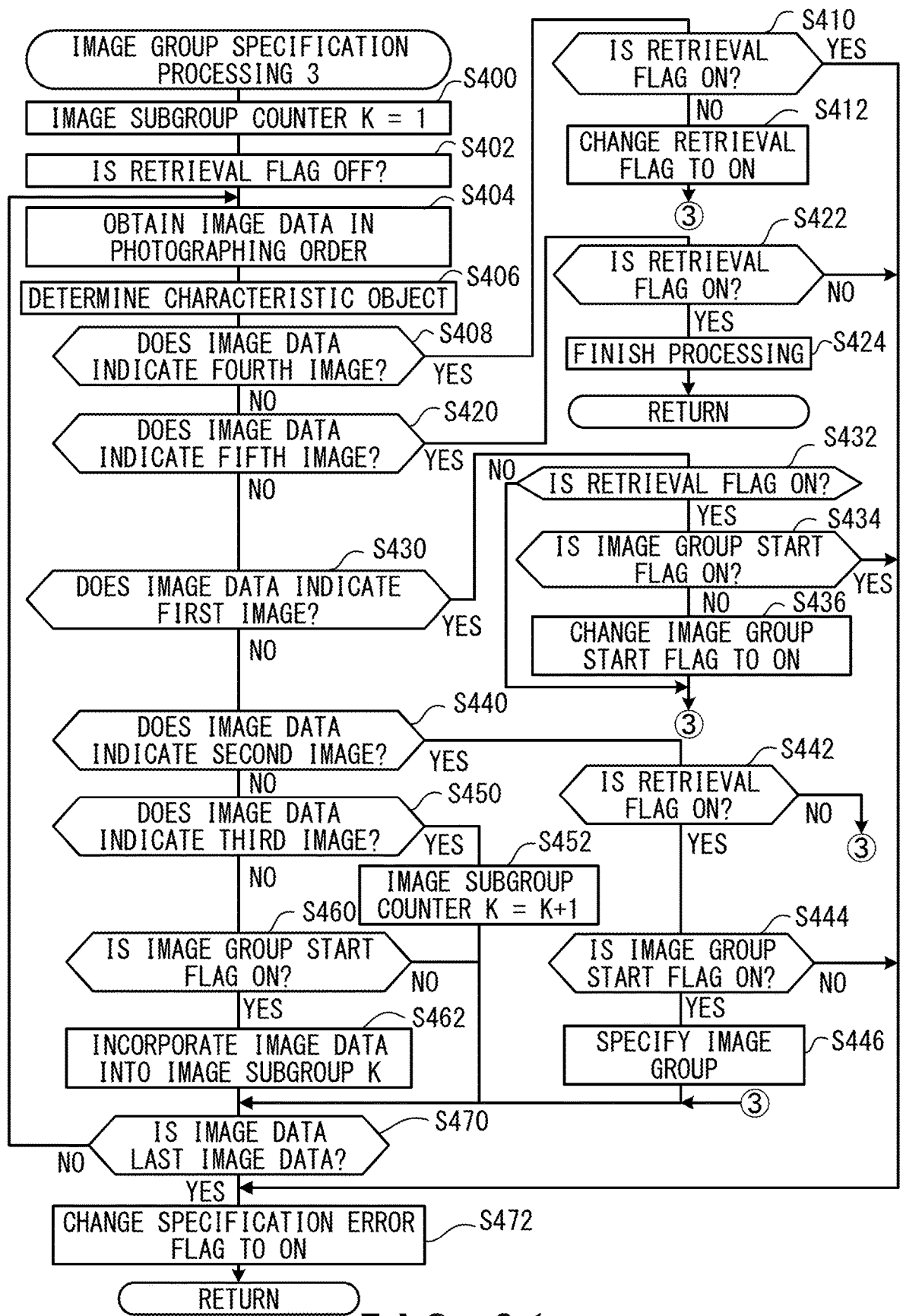
FIG. 21 illustrates a subroutine of image group specification processing 3 according to the third embodiment.

Step S10 to step S16 are common to those in the flowchart illustrated in FIG. 6 according to the first embodiment, and the description thereof is omitted. The image retrieval apparatus 110 performs image group specification processing 3 (step S20b). FIG. 21 is a flowchart explaining a procedure of the image group specification processing 3 according to the third embodiment.

The image group specification unit 330 changes an image subgroup counter K such that K=1 (step S400). The image retrieval control unit 120 changes a retrieval flag to OFF (step S402). The retrieval flag is a flag indicating that retrieval for the image group specification processing is being performed. As described below in detail, the retrieval flag changes from OFF to ON when the fourth image appears, and the retrieval flag changes from ON to OFF when the fifth image appears.

The image retrieval control unit 120 obtains image data of one captured image stored in the storage 60 at a time in order of earliness of a photographing date (step S404). The determination unit 320 determines whether the obtained image data includes a characteristic object (step S406).

The determination unit 320 determines whether the obtained image data indicates the fourth image (step S408). When the determination unit 320 determines that the obtained image data indicates the fourth image (YES in step S408), the image retrieval control unit 120 determines whether the retrieval flag is ON (step S410). When the image retrieval control unit 120 determines that the retrieval flag is ON (YES in step S410), the image retrieval control unit 120 determines that an error has been generated, and the processing moves on to step S472. The image retrieval control unit 120 changes a specification error flag to ON (step S472), and the processing moves on to step S22 of FIG. 20.

When the image retrieval control unit 120 determines that the retrieval flag is not ON (NO in step S410), the image retrieval control unit 120 changes the retrieval flag to ON (step S412), and the processing moves on to step S470. The image retrieval control unit 120 determines whether image data is the last image data in photographing order (step S470). When the image retrieval control unit 120 determines that image data is not the last image data (NO in step S470), the processing returns to step S404, and the image retrieval control unit 120 processes image data in the next photographing order.

When the determination unit 320 determines that image data does not indicate the fourth image (NO in step S408), the determination unit 320 determines whether the image data indicates the fifth image (step S420). When the determination unit 320 determines that the image data indicates the fifth image (YES in step S420), the image retrieval control unit 120 determines whether the retrieval flag is ON (step S422). When the image retrieval control unit 120 determines that the retrieval flag is ON (YES in step S422), the image retrieval control unit 120 finishes processing for specifying an image group (step S424). In addition, the image group specification unit 330 changes the image group start flag to OFF, and clears the image subgroup counter K to 0. The processing moves on to step S22 of FIG. 20.

When the image retrieval control unit 120 determines that the retrieval flag is not ON (NO in step S422), the image retrieval control unit 120 determines that an error has been generated, and the processing moves on to step S472.

When the determination unit 320 determines that the image data does not indicate the fifth image (NO in step S420), the determination unit 320 determines whether the image data indicates the first image (step S430). When the determination unit 320 determines that the obtained image data indicates the first image (YES in step S430), the image retrieval control unit 120 determines whether the retrieval flag is ON (step S432).

When the image retrieval control unit 120 determines that the retrieval flag is not ON (NO in step S432), the processing moves on to step S470. When the image retrieval control unit 120 determines that the retrieval flag is ON (YES in step S432), the image group specification unit 330 determines whether the image group start flag is OFF (step S434). The image group start flag is as described above in the first embodiment.

When the image group specification unit 330 determines that the image group start flag is ON (YES in step S434), the image group specification unit 330 determines that an error has been generated, and the processing moves on to step S472. When the image group specification unit 330 determines that the image group start flag is not ON (NO in step S434), the image group specification unit 330 changes the image group start flag to ON (step S436), and the processing moves on to step S470.

When the determination unit 320 determines that the image data does not indicate the first image (NO in step S430), the determination unit 320 determines whether the image data indicates the second image (step S440). When the determination unit 320 determines that the image data indicates the second image (YES in step S440), the image retrieval control unit 120 determines whether the retrieval flag is ON (step S442). When the image retrieval control unit 120 determines that the retrieval flag is not ON (NO in step S442), the processing moves on to step S470. When the image retrieval control unit 120 determines that the retrieval flag is ON (YES in step S442), the image group specification unit 330 determines whether the image group start flag is ON (step S444).

When the image group specification unit 330 determines that the image group start flag is not ON (NO in step S444), the image group specification unit 330 determines that an error has been generated, and the processing moves on to step S472. When the image group specification unit 330 determines that the image group start flag is ON (YES in step S444), the image group specification unit 330 specifies an image group (step S446), and the processing moves on to step S470.

When the determination unit 320 determines that the obtained image data does not indicate the second image (NO in step S440), the determination unit 320 determines whether the obtained image data indicates the third image (step S450). When the determination unit 320 determines that the obtained image data indicates the third image (YES in step S450), the image retrieval control unit 120 changes the image subgroup counter K such that K=K+1 (step S452), and the processing moves on to step S470. In this case, assume that the image group start flag is ON.

When the determination unit 320 determines that the obtained image data does not indicate the third image (NO in step S450), the image group specification unit 330 determines whether the image group start flag is ON (step S460). When the image group specification unit 330 determines that the image group start flag is ON (YES in step S460), the image group specification unit 330 incorporates the image data into image subgroup K (step S462), and the processing moves on to step S470. When the image group specification unit 330 determines that the image group start flag is not ON (NO in step S460), the processing moves on to step S470.

Return now to FIG. 20. The image retrieval control unit 120 determines whether the specification error flag is ON (step S22). When the image retrieval control unit 120 determines that the specification error flag is ON (YES in step S22), the image retrieval control unit 120 finishes the image retrieval processing. When the image retrieval control unit 120 determines that the specification error flag is not ON (NO in step S22), the representative image extraction unit 140 performs representative image extraction processing (step S24b).

The representative image extraction processing is performed on each of the detected image subgroups. The representative image extraction unit 140 extracts a representative image from each of the image subgroups. The specific content of the representative image extraction processing is the same as FIG. 9 to FIG. 14 described in the first embodiment, and the description thereof is omitted. In the example of FIG. 19, as an example, image D50, image D54, and image D58 are respectively extracted as representative images from image subgroup 1, image subgroup 2, and image subgroup 3.

The image retrieval control unit 120 issues an instruction to perform a process for changing the size of image data (step S26b). Similarly to the first embodiment, the image retrieval control unit 120 issues, to the image management device 100, an instruction to reduce the size of image data of a characteristic object image. In addition, the image retrieval control unit 120 issues, to the image management device 100, an instruction to convert image data of target images for image retrieval excluding the characteristic object image so as to have a size that conforms to a prescribed standard. The prescribed standard is a standard that is defined for documents or data to be submitted to public institutions or national agencies. Similarly to the first embodiment, after the image retrieval processing is finished, the image management device 100 transmits image data of a series of captured images stored in the storage 60 to the server 8. The image management device 100 may transmit only image data of a representative image in each of the image subgroups to the server 8, after the image retrieval processing is finished.

As described above, by employing the image retrieval apparatus according to the third embodiment, a target for image retrieval is clearly specified, and therefore even when the first characteristic object or the like is photographed in a situation in which a photographer does not intend to specify an image group, an erroneous image group specification can be prevented.

Summary

In Patent Document 1 listed above, images having a similar composition are collected, and an image group is generated. In this method, in an environment including a large number of similar compositions, such as a construction site, a problem arises wherein image groups that are different from each other in practice are specified as one image group.

At an actual construction site, an operation is often performed in a situation in which the same site is divided into plural sites, in order to manage the progress of a construction. In this case, it is requested that images obtained by photographing respective operations be managed as individual image groups. However, in the technology described in Patent Document 1, the images may be collected as one image group because the respective operations are performed at the same work site. In addition, in the technology described in Patent Document 1, images obtained at different angles at the same site may fail to be treated as the same image group. In any of the cases, it is difficult to specify an image group, as desired by a photographer, by using the technology described in Patent Document 1.

In addition, the paragraph image described in Patent Document 2 listed above is a "monochrome or blue-back" image, or has a "peculiar shape that is different from the shape of another image". Namely, the paragraph image in Patent Document 2 is an image obtained by giving an arrow to an image frame or by changing a frame itself to a frame different from the frame of a normal image, and the paragraph image is an image that requires special processing to be displayed or recorded. Therefore, it is difficult to employ the paragraph image at a site.

According to the first embodiment to the third embodiments described above, an image retrieval apparatus, an image retrieval method, and a program that classify a series of captured images into image groups can be provided.

Other Examples

In the embodiments above, an example in which an image retrieval apparatus is provided in the information processing apparatus 6 has been described. However, the image retrieval apparatus may be provided in the server 8, or may be provided in the camera 5.

In the embodiments above, in the flowchart of FIG. 6, in a case in which a series of captured images include a plurality of image groups, an image group is specified for each of the image groups, and after image group specification is finished, a representative image is extracted from each of the specified image groups. However, processing is not always performed in this order. As an example, a pair of the specification of one image group and the extraction of a representative image may be continuously performed.

The camera 5 and the information processing apparatus 6 have been described to be separately configured. However, the camera 5 and the information processing apparatus 6 may be integrally configured to be, for example, a tablet type terminal device with a camera or a camera with a communication function.

In addition, an example has been described in which the image retrieval apparatus is implemented by software processing performed by a CPU that reads a prescribed program. However, a portion or the entirety of the image retrieval apparatus may be configured by hardware.

Note that the present invention is not limited exactly to the above embodiments, and can be embodied in the implementation phases by modifying constitutional elements without departing from the spirit of the present invention. Also, it is possible to form various inventions by an appropriate combination of a plurality of constituent elements disclosed in the above embodiments. For example, all the constituent elements disclosed in the above embodiments may be combined appropriately. Further, constituent elements selected from different embodiments may be combined appropriately. It is as a matter of course that these various modification and application are possible without departing from the spirit of the present invention.

EXPLANATIONS OF LETTERS OR NUMERALS

1 Photographing system
5 Camera
6 Information processing apparatus
7 Network
8 Server
20 CPU
30 RAM
40 Memory
50 Communication unit
60 Storage
70 Display unit
80 Operation unit
100 Image management device
110 Image retrieval apparatus
120 Image retrieval control unit
130 Image group processing unit
140 Representative image extraction unit
310 Characteristic object registration unit
320 Determination unit
330 Image group specification unit
410 Extraction condition establishment unit
420 Most frequent image score calculation unit
430 Exposure score calculation unit
440 Subject blurring score calculation unit
450 Focusing score calculation unit

What is claimed is:
1. An image retrieval apparatus comprising:
a processor communicatively coupled to a storage device that stores a plurality of captured images, the processor:
 registering a first characteristic object and a second characteristic object that is distinct from the first characteristic object;
 determining an image in which the first characteristic object is included in a subject to be a first image, and determining an image that is captured after the first image and in which the second characteristic object is included in the subject to be a second image, from among a series of the captured images;

specifying images as an image group, the images in the image group being captured during a period after the first image is captured and before the second image is captured from among the series of the captured images; and extracting a representative image from the image group.

2. The image retrieval apparatus according to claim 1, wherein the extracting the representative image compares respective images included in the image group according to a prescribed condition, and extracts the representative image.

3. The image retrieval apparatus according to claim 2, wherein the extracting the representative image extracts the representative image by using, as the prescribed condition, a degree of appropriateness of an exposure, an amount of blurring of the subject, a degree of focusing of the subject, or any combination thereof.

4. The image retrieval apparatus according to claim 3, wherein the extracting the representative image uses at least the amount of blurring of the subject and the degree of focusing of the subject as the prescribed condition, and prioritizes the amount of blurring of the subject over the degree of focusing of the subject when a photographing environment is a dark place.

5. The image retrieval apparatus according to claim 2, wherein the extracting the representative image extracts the representative image by using a composition that most frequently appears in the respective images included in the image group as at least one item of the prescribed condition.

6. The image retrieval apparatus according to claim 2, wherein when the prescribed condition includes a plurality of items, the extracting the representative image specifies priority orders for the plurality of items of the prescribed condition, compares the respective images, and extracts the representative image.

7. The image retrieval apparatus according to claim 1, wherein the registering registers a third characteristic object;

the determining determines an image in which the third characteristic object is included in the subject to be a third image;

the specifying images as the image group divides images included in the image group into images captured before the third image and images captured after the third image, and specifies a plurality of image subgroups; and the extracting the representative image extracts the representative image from each of the specified plurality of image subgroups.

8. The image retrieval apparatus according to claim 1, wherein the registering registers a fourth characteristic object and a fifth characteristic object;

the determining determines an image in which the fourth characteristic object is included in the subject to be a fourth image, and determines an image that is captured after the fourth image and in which the fifth characteristic object is included in the subject to be a fifth image; and the specifying images as the image group specifies the image group by using the first image and the second image from among images that are captured during a period after the fourth image is captured and before the fifth image is captured.

9. The image retrieval apparatus according to claim 8, wherein a size of image data is changed to a prescribed size, for images that are captured during the period after the fourth image is captured and before the fifth image is captured in image data of the series of captured images stored in the storage device.

10. The image retrieval apparatus according to claim 1, wherein all or some of the series of captured images other than the image extracted as the representative image are deleted from image data of the series of captured images stored in the storage device.

11. The image retrieval apparatus according to claim 1, wherein a size of image data is reduced for the determined first image or the determined second image in image data of the series of captured images stored in the storage device.

12. An image retrieval method that causes an information processing apparatus communicatively coupled to a storage device that stores a plurality of captured images to perform image retrieval, the image retrieval method comprising:

registering a first characteristic object and a second characteristic object that is distinct from the first characteristic object;

determining an image in which the first characteristic object is included in a subject to be a first image, and determining an image that is captured after the first image and in which the second characteristic object is included in the subject to be a second image, from among a series of the captured images;

specifying images as an image group, the images being captured during a period after the first image is captured and before the second image is captured from among the series of the captured images; and extracting a representative image from the image group.

13. A computer-readable non-transitory storage medium having stored therein a program for causing a computer communicatively coupled to a memory that stores a plurality of captured images to perform image retrieval, the program comprising:

registering a first characteristic object and a second characteristic object that is distinct from the first characteristic object;

determining an image in which the first characteristic object is included in a subject to be a first image, from among a series of the captured images;

determining an image that is captured after the first image and in which the second characteristic object is included in the subject to be a second image;

specifying images as an image group, the images being captured during a period after the first image is captured and before the second image is captured from among the series of the captured images; and extracting a representative image from the image group.

* * * * *